(12) United States Patent
Zhang et al.

(10) Patent No.: US 12,351,687 B2
(45) Date of Patent: Jul. 8, 2025

(54) THIOCARBONYL-BASED POLY(O-THIOCARBAMATE) COMPOUND AND PREPARATION METHOD AND USE THEREOF

(71) Applicant: Zhejiang University, Hangzhou (CN)

(72) Inventors: Jie Zhang, Hangzhou (CN); Jingzhi Sun, Hangzhou (CN)

(73) Assignee: Zhejiang University, Hangzhou (CN)

( * ) Notice: Subject to any disclaimer, the term of this patent is extended or adjusted under 35 U.S.C. 154(b) by 794 days.

(21) Appl. No.: 17/625,218

(22) PCT Filed: Apr. 12, 2021

(86) PCT No.: PCT/CN2021/086594
§ 371 (c)(1),
(2) Date: Jan. 6, 2022

(87) PCT Pub. No.: WO2022/116463
PCT Pub. Date: Jun. 9, 2022

(65) Prior Publication Data
US 2023/0002559 A1    Jan. 5, 2023

(30) Foreign Application Priority Data

Dec. 3, 2020    (CN) .......................... 202011408711.4

(51) Int. Cl.
*C08G 75/00* (2006.01)
*C08L 81/00* (2006.01)

(52) U.S. Cl.
CPC .............. *C08G 75/00* (2013.01); *C08L 81/00* (2013.01)

(58) Field of Classification Search
CPC ................................ C08G 75/00; C08L 81/00
See application file for complete search history.

(56) References Cited

U.S. PATENT DOCUMENTS 5,084,545 A * 1/1992 Nagata ............... C08G 18/7893
351/159.01

FOREIGN PATENT DOCUMENTS

JP        2010114122 A  *  5/2010

* cited by examiner

*Primary Examiner* — Gregory Listvoyb
(74) *Attorney, Agent, or Firm* — ASHLEY LAW FIRM P.C.; Stephen S. Ashley, Jr.

(57) ABSTRACT

The present disclosure provides a new thiocarbonyl-based poly(O-thiocarbamate) compound with a structure represented by Formula I below, which has a sulfur element introduced, and has good solubility and high molecular weight.

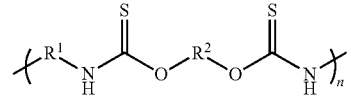

Formula I

2 Claims, 7 Drawing Sheets

THIOCARBONYL-BASED POLY(O-THIOCARBAMATE) COMPOUND AND PREPARATION METHOD AND USE THEREOF

CROSS REFERENCE TO RELATED APPLICATION

This patent application is a national stage application of International Application No. PCT/CN2021/086594, filed Apr. 12, 2021, which claims the benefit and priority of the Chinese patent application No. 202011408711.4 filed on Dec. 3, 2020, titled "Thiocarbonyl-based poly(O-thiocarbamate) compound and preparation method and use thereof", which is incorporated by reference herein in its entirety as part of the present application.

TECHNICAL FIELD

The present disclosure relates to the technical field of polymer chemistry and material science, and in particular to a thiocarbonyl-based poly(O-thiocarbamate) compound and a preparation method and use thereof.

BACKGROUND ART

Animals and plants in nature, including human beings, are composed of polymers as important components. Human production and life are inseparable from polymers. Therefore, in just a few decades, polymer science has developed rapidly and formed an independent and important discipline. In recent years, more and more researchers have devoted themselves to the exploration of new polymers and the preparation methods thereof in order to provide a steady and continuous power for the development of new materials.

Sulfur, the second most abundant element in fossil fuels after carbon, is often used in the preparation of vulcanized rubber, pesticides and sulfuric acid. Elemental sulfur exists in the form of an eight-membered ring at room temperature, with a melting point of 112.8° C. In terms of polymer synthesis, the reactions involving elemental sulfur usually require high temperature conditions, and the resulting polymers are often insoluble cross-linked products, which are difficult to be characterized and processed. Therefore, the application of elemental sulfur in polymer synthesis faces limitations and challenges. Nevertheless, at the same time, sulfur has a high molar refractive index, so that sulfur-containing polymers can have a high refractive index, and play an important role in the development of new optical materials. Therefore, the difficulty of applying elemental sulfur to polymer synthesis needs to be resolved urgently.

SUMMARY

In view of this, an object of the present disclosure is to provide a thiocarbonyl-based poly(O-thiocarbamate) compound and a preparation method and use thereof. In the present disclosure, the thiocarbonyl-based poly(O-thiocarbamate) compound has a very high refractive index due to the introduction of sulfur element.

In order to achieve the above object, the present disclosure provides the following technical schemes:

The present disclosure provides a thiocarbonyl-based poly(O-thiocarbamate) compound having a structure represented by Formula I:

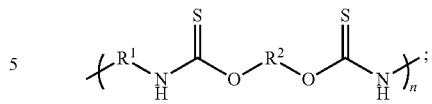

Formula I in Formula I, n is an integer in a range of 2 to 430;

$R^1$ is any one selected from the group consisting of Formula 1 to Formula 19:

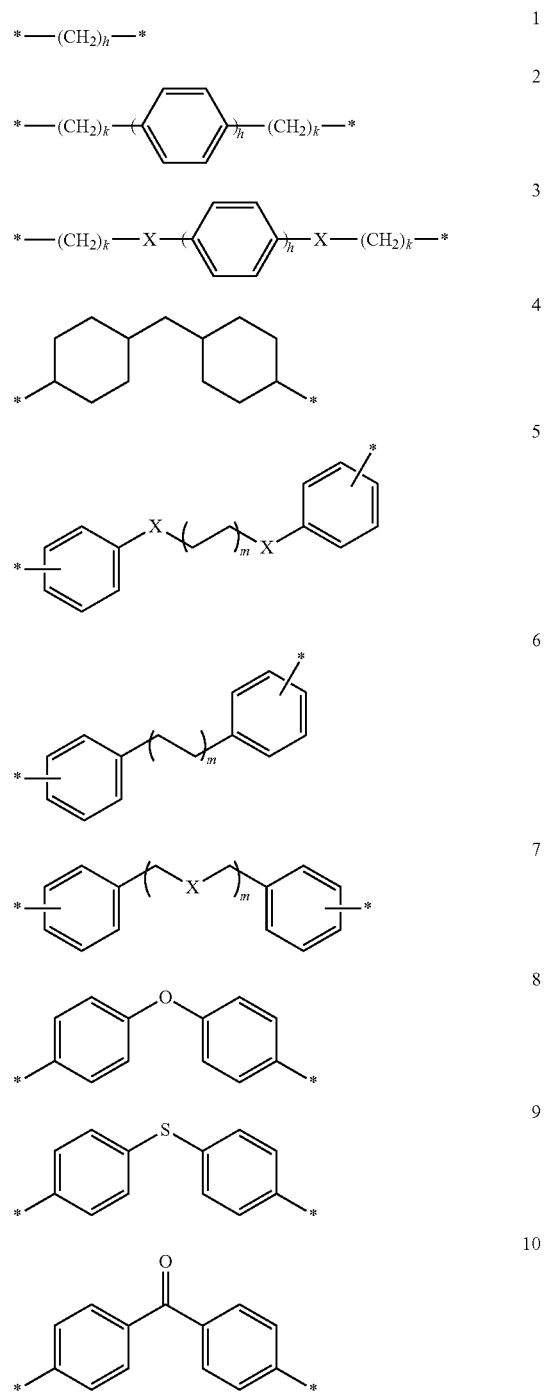

-continued

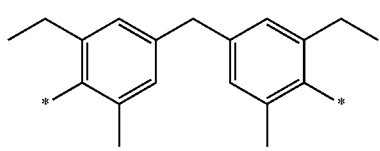
11

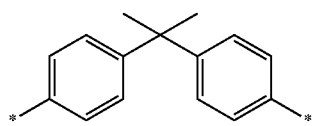
12

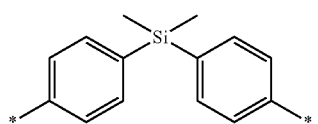
13

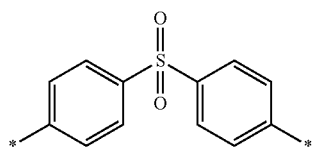
14

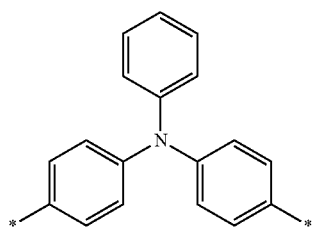
15

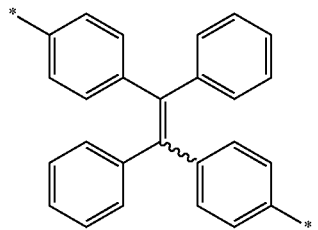
16

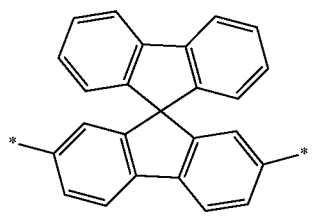
17

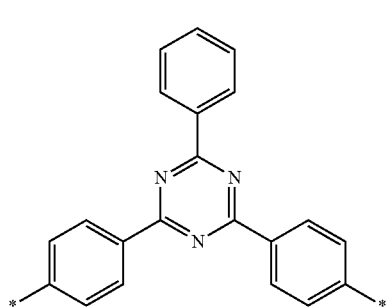
18

-continued

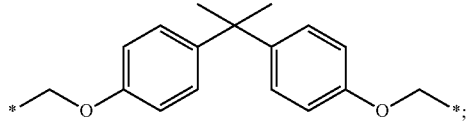
19

$R^2$ is any one selected from the group consisting of Formula 1 to Formula 4 and Formula 20 to Formula 26:

20

21

22

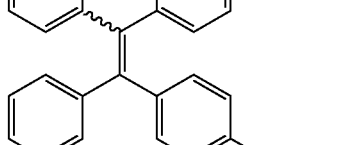
23

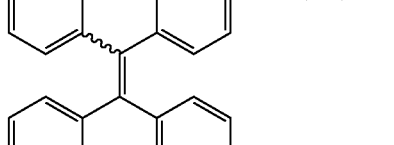
24

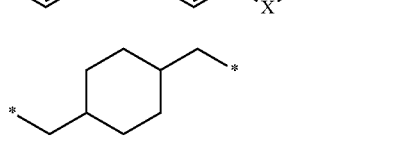
25

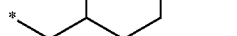
26

in Formula 1 to Formula 26, h is independently an integer in a range of 1 to 20, m and k are independently integers in a range of 0 to 20; X is selected from the group consisting of NH, PH, O, S and $SiH_2$; * represents a substitution position.

In some embodiments, $R^1$ is selected from the group consisting of Formula 4 and Formula 11, and $R^2$ is selected from the group consisting of Formula 2-1, Formula 3-1, Formula 20-1, Formula 21-1, Formula 23-1 and Formula 23-2:

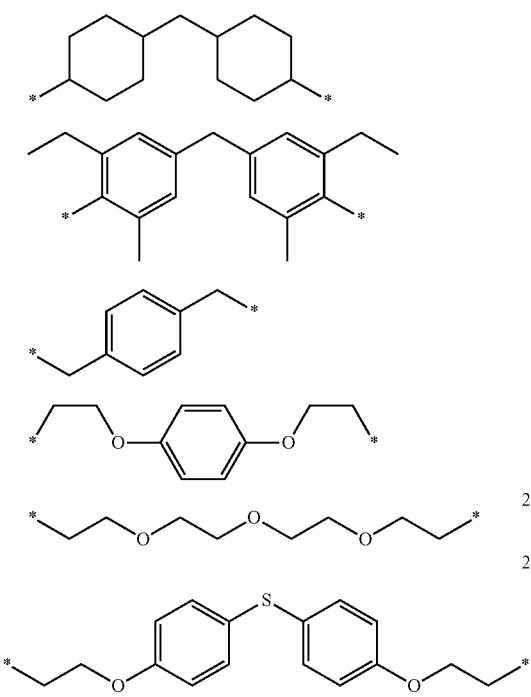
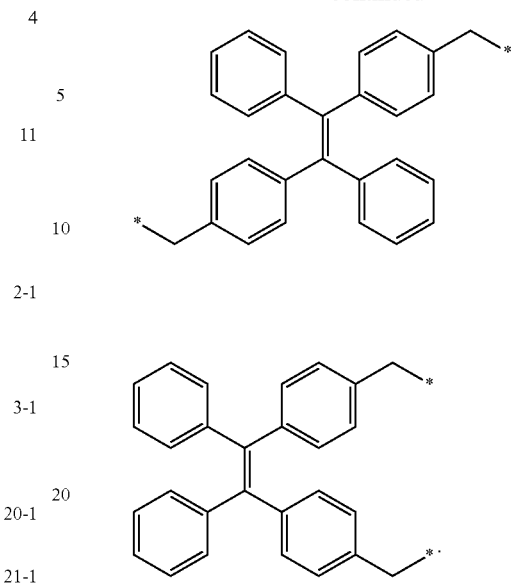
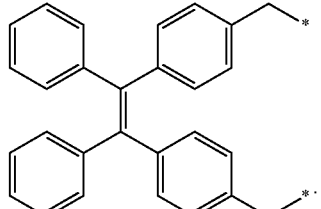
In some embodiments, the structural formula of the thiocarbonyl-based poly(O-thiocarbamate) compound is any one selected from the group consisting of Formula I-1 to Formula I-7:
Formula I-1
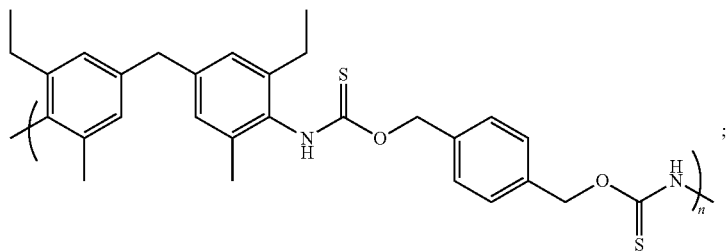
Formula I-2
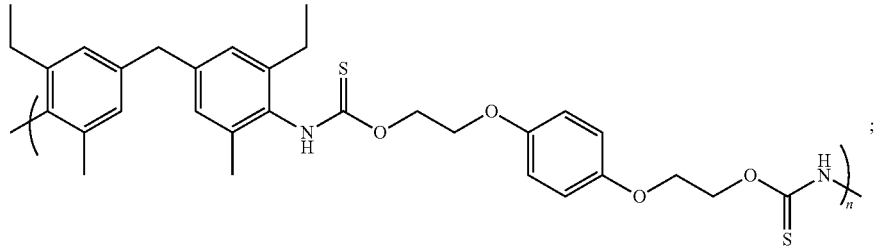
Formula I-3
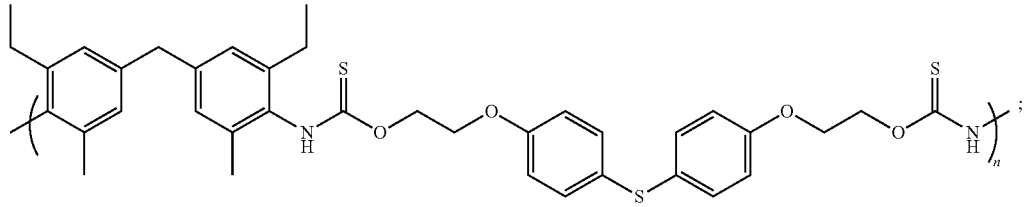

Formula I-4
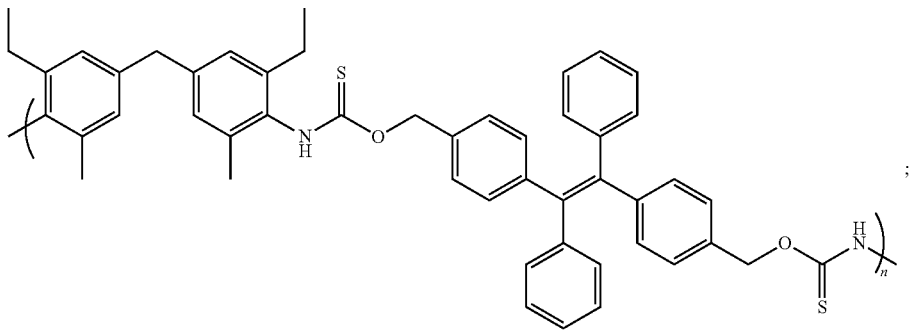

Formula I-5
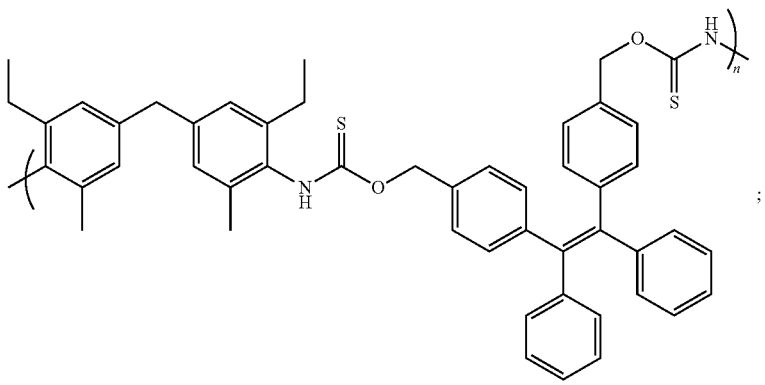

Formula I-6
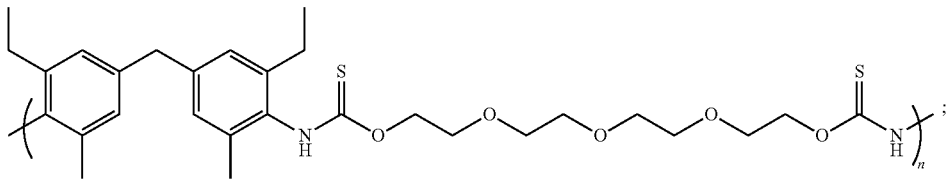

Formula I-7
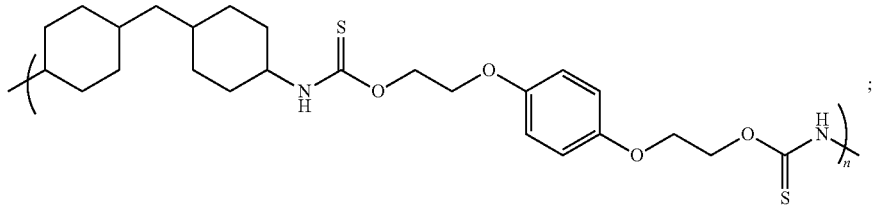

wherein n is an integer in a range of 2 to 430.

The present disclosure also provides a method for preparing the thiocarbonyl-based poly(O-thiocarbamate) compound described in the above technical schemes, comprising:

mixing a bifunctional isocyanide compound, a diol compound and elemental sulfur in an organic solvent, and subjecting to a polymerization reaction under a basic catalyst to obtain the thiocarbonyl-based poly(O-thiocarbamate) compound having the structure represented by Formula I;

the structural formula of the bifunctional isocyanide compound is represented by Formula II:

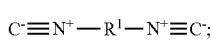  Formula II the structural formula of the diol compound is represented by Formula III:

HO—R²—OH    Formula III;

$R^1$ and $R^2$ are defined the same as those in the structure represented by Formula I.

In some embodiments, a molar ratio of the bifunctional isocyanide compound to the diol compound is 1:1, and a molar ratio of the bifunctional isocyanide compound to elemental sulfur is in a range of 1:2-1:4.

In some embodiments, the amount-of-substance concentration of the bifunctional isocyanide compound in the reaction system is in a range of 0.1-0.3 mol/L.

In some embodiments, the amount-of-substance concentration of the bifunctional isocyanide compound in the reaction system is 0.2 mol/L.

In some embodiments, the polymerization reaction is performed at a temperature of 25-100° C., and the polymerization reaction is performed for 0.5-6 h.

In some embodiments, the polymerization reaction is performed at a temperature of 25-60° C., and the polymerization reaction is performed for 0.5-4 h.

In some embodiments, the organic solvent comprises one or more selected from the group consisting of dimethylsulfoxide, N,N-dimethylformamide, N,N-dimethylacetamide, N-methylpyrrolidone and tetrahydrofuran.

In some embodiments, the basic catalyst is an organic base or an inorganic base.

In some embodiments, the basic catalyst comprises one or more selected from the group consisting of 1,8-diazabicyclo[5.4.0]undec-7-ene, 1,4-diazabicyclo[2.2.2]octane, potassium hydroxide and sodium hydride.

The present disclosure also provides use of the thiocarbonyl-based poly(O-thiocarbamate) compound described in the above technical schemes or the thiocarbonyl-based poly(O-thiocarbamate) compound prepared by the method described in the above technical schemes in the field of optical materials.

The present disclosure provides a new thiocarbonyl-based poly(O-thiocarbamate) compound with a structure represented by Formula I, which has sulfur element introduced, and has good solubility and high molecular weight. The thiocarbonyl-based poly(O-thiocarbamate) compound provided has good thermal stability and a very high refractive index, being expected to have desirable applications in the optical field.

The present disclosure also provides a method for preparing the thiocarbonyl-based poly(O-thiocarbamate) compound described in the above technical schemes, comprising: mixing a bifunctional isocyanide compound, a diol compound and elemental sulfur in an organic solvent, and subjecting to a polymerization reaction under a basic catalyst to obtain the thiocarbonyl-based poly(O-thiocarbamate) compound having the structure represented by Formula I. In the present disclosure, the bifunctional isocyanide compound, the diol compound and elemental sulfur are used to carry out a polymerization reaction to prepare the thiocarbonyl-based poly(O-thiocarbamate) compound, which is simple and novel, and has a high atom utilization rate. In terms of mechanism, the bifunctional isocyanide compound is apt to form an intermediate with elemental sulfur in an alkaline environment, the basic catalyst makes the reaction system to be alkaline, which is beneficial to the formation of the reaction intermediate and oxygen anions, and the diol compound is apt to form the oxygen anions to attack the intermediate in the alkaline environment, and thus the thiocarbonyl-based poly(O-thiocarbamate) compound having the structure represented by Formula I is obtained finally. Compared with the prior art, the preparation method provided in the present disclosure has the following beneficial effects:

(1) In the preparation method of the present disclosure, three components of a bifunctional isocyanide compound, a diol compound and elemental sulfur are used to generate a thiocarbonyl-based poly(O-thiocarbamate) compound via one-step polymerization by the one-pot process, wherein the raw materials of the diol compound and elemental sulfur are abundant, cheap and easily available.

(2) The preparation method of the present disclosure has mild polymerization conditions and a simple process, and is efficient and rapid, making it possible to obtain polymers with relatively high molecular weight in a high yield.

(3) In the preparation method of the present disclosure, no by-product is generated during the polymerization, and the atom efficiency is 100%, which conforms to atom economy.

(4) In the preparation method of the present disclosure, the catalyst required is cheap and easily available, and is very easy to be removed, so that the cytotoxicity caused by the residual catalyst and the influence on the photoelectric performance of the material can be eliminated.

Further, the concentration of the bifunctional isocyanide compound will affect the rate of the polymerization reaction and the yield of the product. In some embodiments, the amount-of-substance concentration of the bifunctional isocyanide compound is in a range of 0.1-0.3 mol/L.

Further, the alkalinity of the basic catalyst has a significant influence on the polymerization reaction. In some embodiments, the basic catalyst is sodium hydride.

Further, the temperature of the polymerization reaction will affect the rate of the polymerization reaction and the yield of the product. In some embodiments, the polymerization reaction is performed at a temperature of 25-100° C.

Further, the time for the polymerization reaction will affect the extent of the reaction. In some embodiments, the polymerization reaction is performed for 0.5-6 h.

Further, under the condition that the organic solvent is N,N-dimethylformamide, the obtained thiocarbonyl-based poly(O-thiocarbamate) compound has higher molecular weight and better solubility, which is convenient for the application of the thiocarbonyl-based poly(O-thiocarbamate) compound.

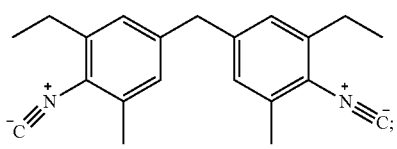

(B) is the infrared absorption spectrum of the monomer

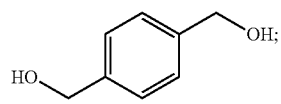

(C) is the infrared absorption spectrum of the thiocarbonyl-based poly(O-thiocarbamate) compound

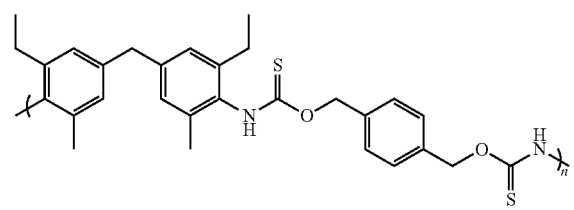

Figure 2:
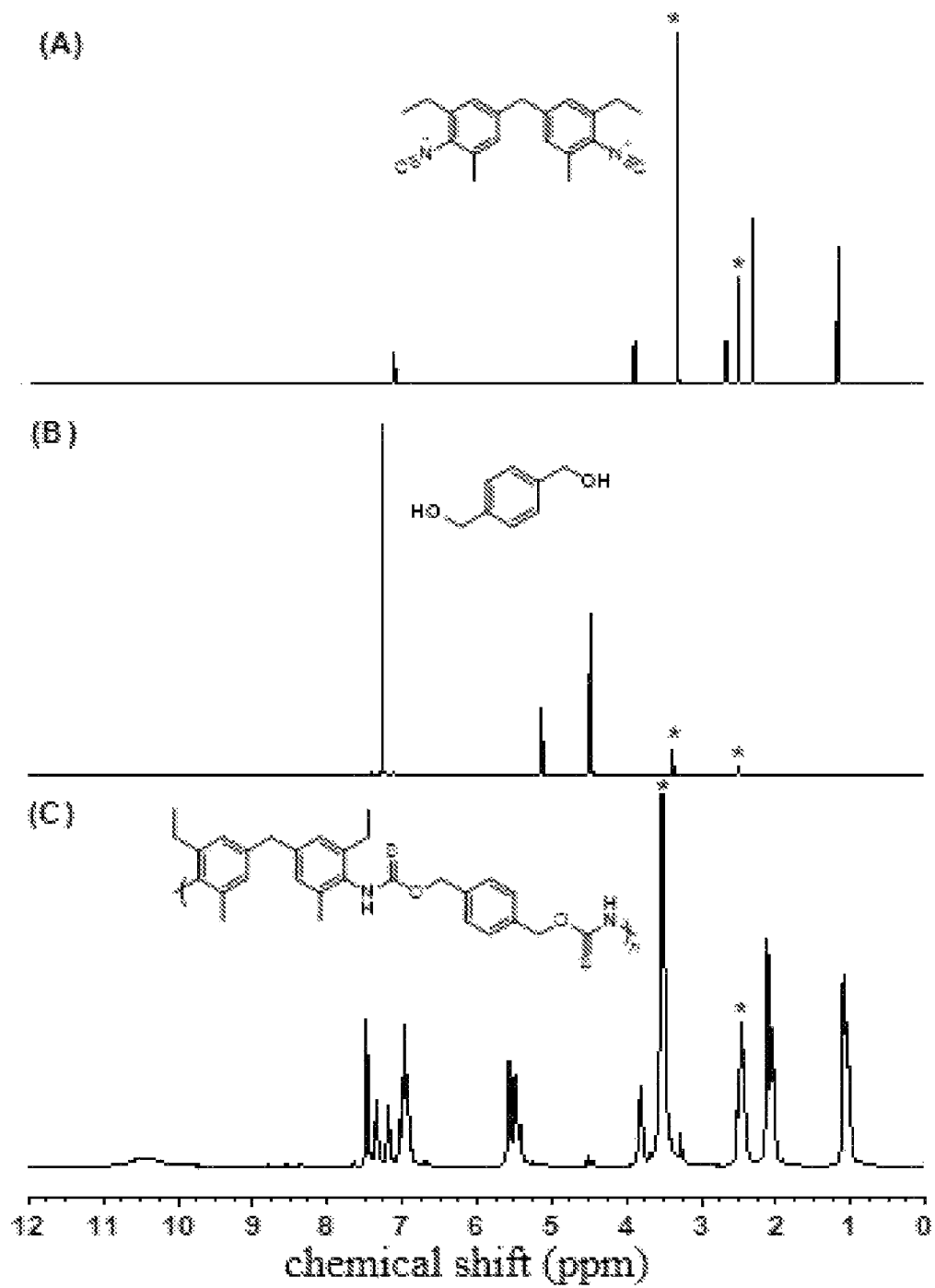

FIG. 2 is a comparison diagram showing the H-NMR spectrums in CDCl₃ of the thiocarbonyl-based poly(O-thiocarbamate) compound and its corresponding monomers in Example 1 (* represents the solvent peak); wherein (A) is the H-NMR spectrum of the monomer

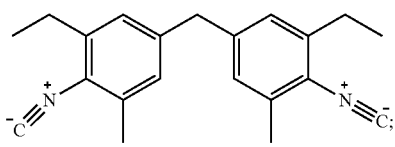

(B) is the H-NMR spectrum of the monomer

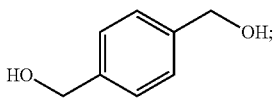

(C) is the H-NMR spectrum of the thiocarbonyl-based poly(O-thiocarbamate) compound

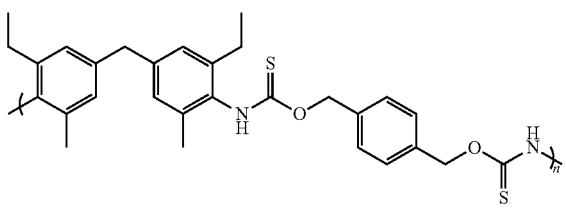

Figure 3:
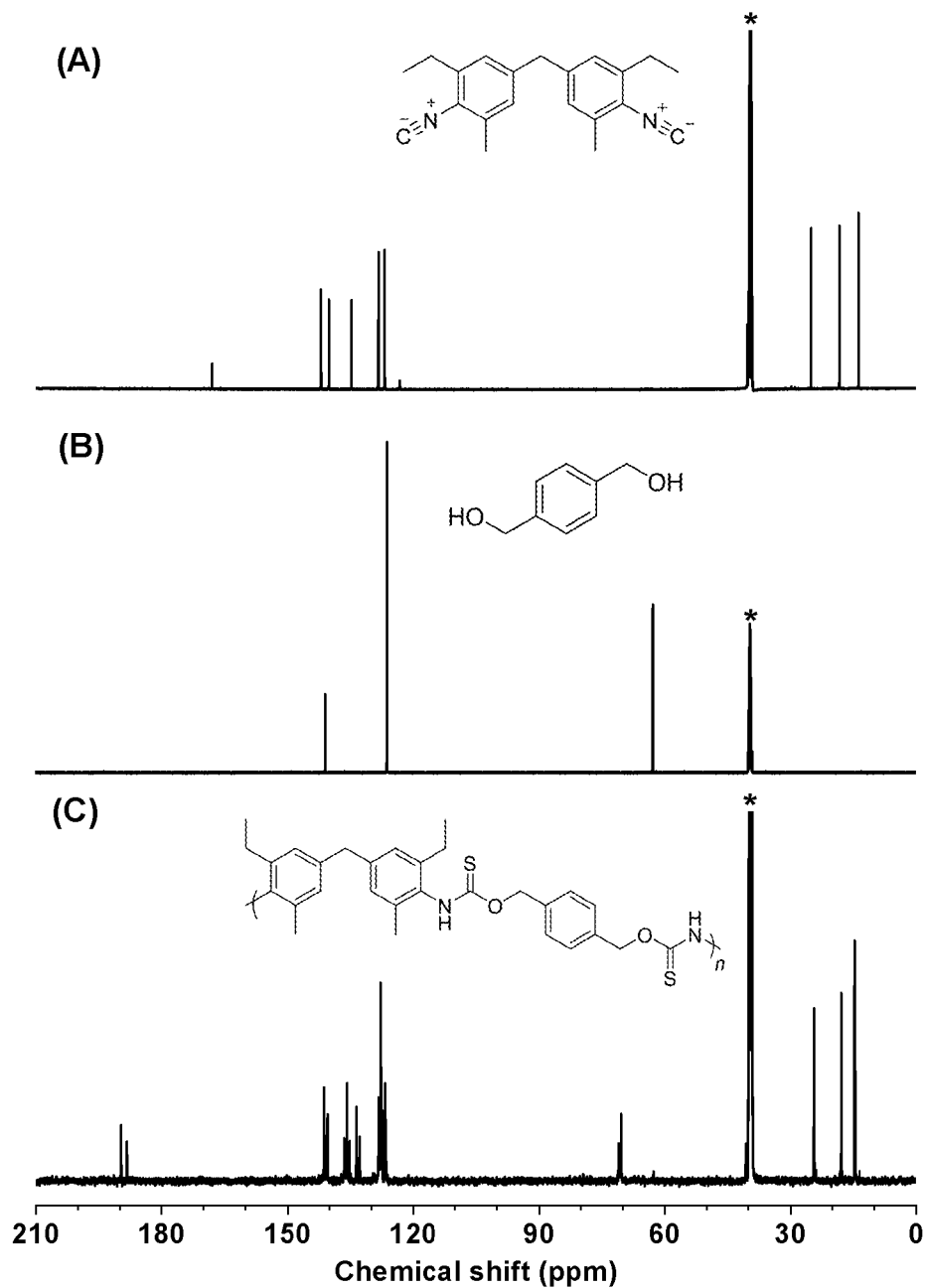

FIG. 3 is a comparison diagram showing the C-NMR spectrums in CDCl₃ of the thiocarbonyl-based poly(O-thiocarbamate) compound and its corresponding monomers in Example 1 (* represents the solvent peak); wherein (A) is the C-NMR spectrum of the monomer

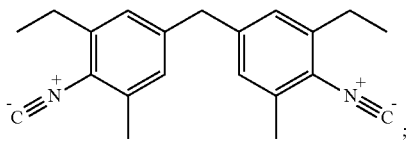

(B) is the C-NMR spectrum of the monomer

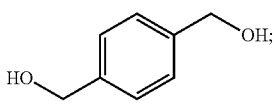

(C) is the C-NMR spectrum of the thiocarbonyl-based poly(O-thiocarbamate) compound

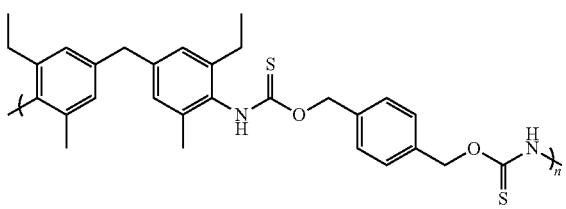

Figure 4:
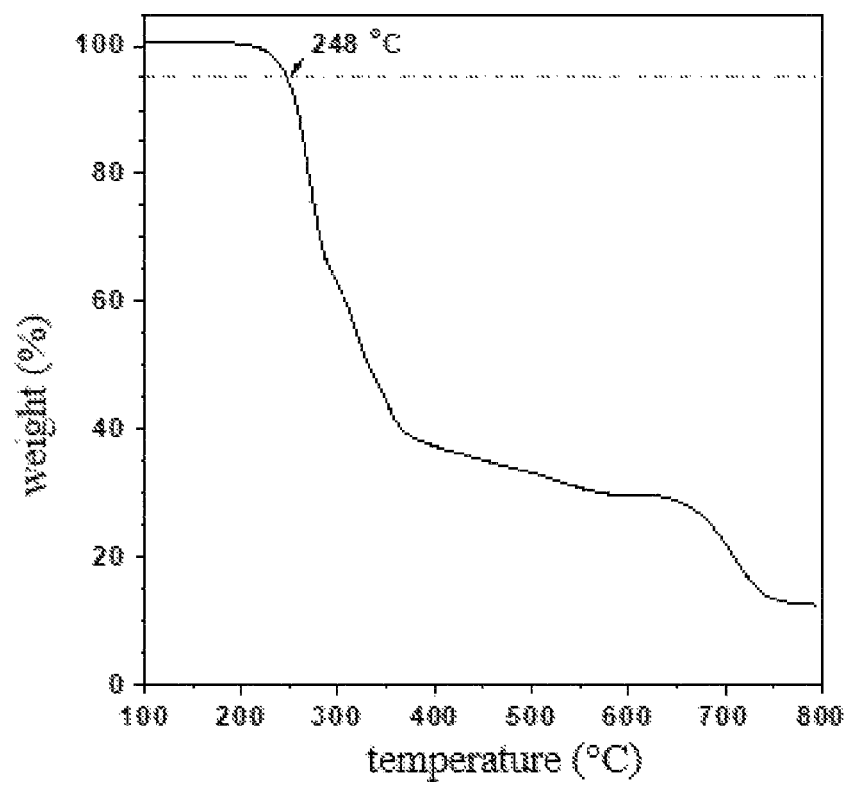

FIG. 4 is a diagram showing a thermal weight loss curve of the thiocarbonyl-based poly(O-thiocarbamate) compound prepared in Example 1.

Figure 5:
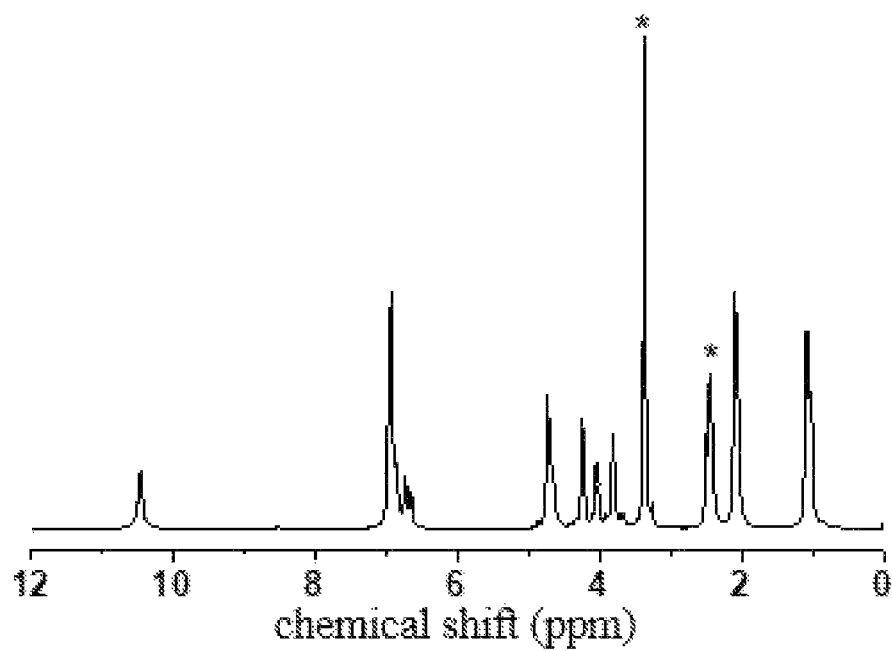

FIG. 5 is a comparison diagram showing the H-NMR spectrum in DMSO-$d_6$ of the thiocarbonyl-based poly(O-thiocarbamate) compound prepared in Example 18 (* represents the solvent peak).

Figure 6:
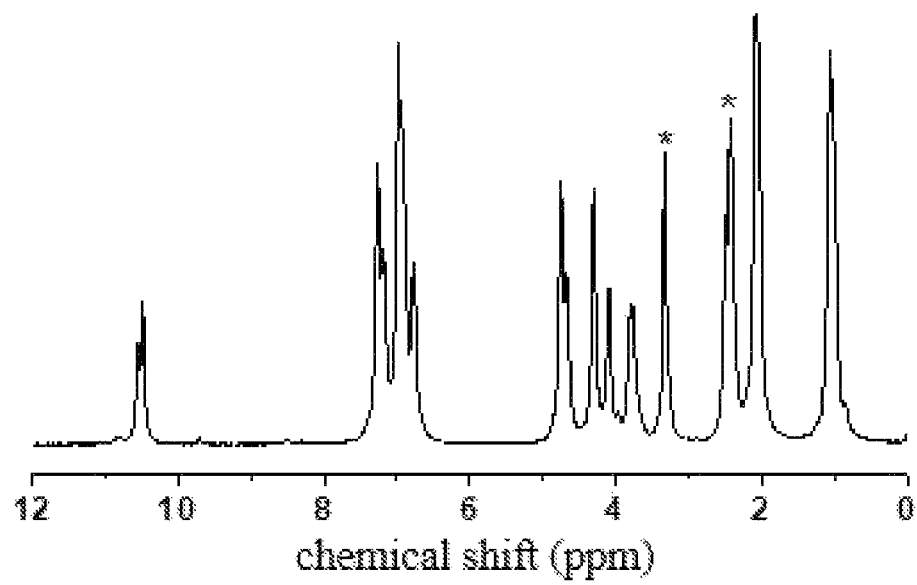

FIG. 6 is a comparison diagram showing the H-NMR spectrum in DMSO-$d_6$ of the thiocarbonyl-based poly(O-thiocarbamate) compound prepared in Example 19 (* represents the solvent peak).

Figure 7:
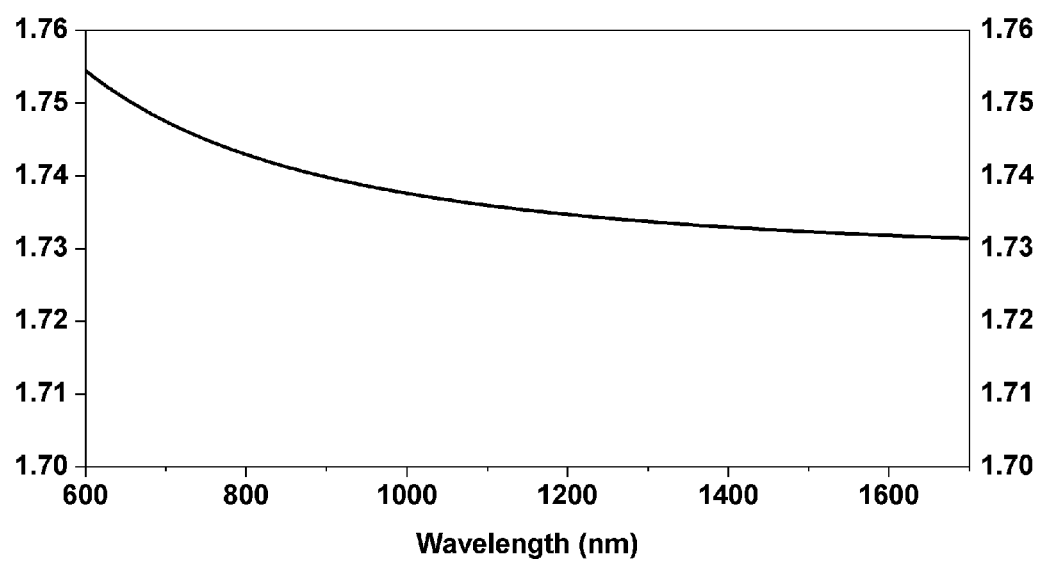

FIG. 7 shows a refractive index graph of the thiocarbonyl-based poly(O-thiocarbamate) compound prepared in Example 19.

Figure 8:
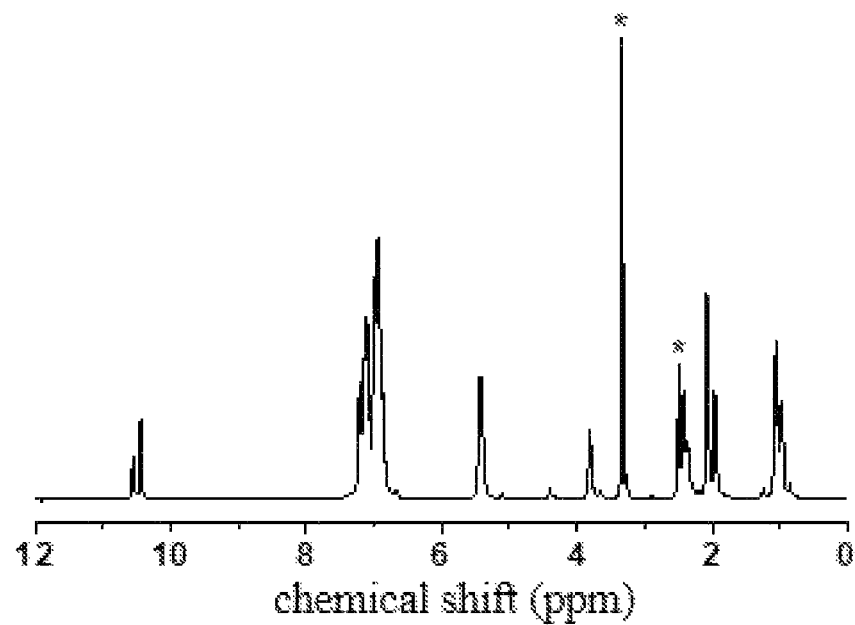

FIG. 8 is a comparison diagram showing the H-NMR spectrum in DMSO-$d_6$ of the thiocarbonyl-based poly(O-thiocarbamate) compound prepared in Example 20 (* represents the solvent peak).

Figure 9:
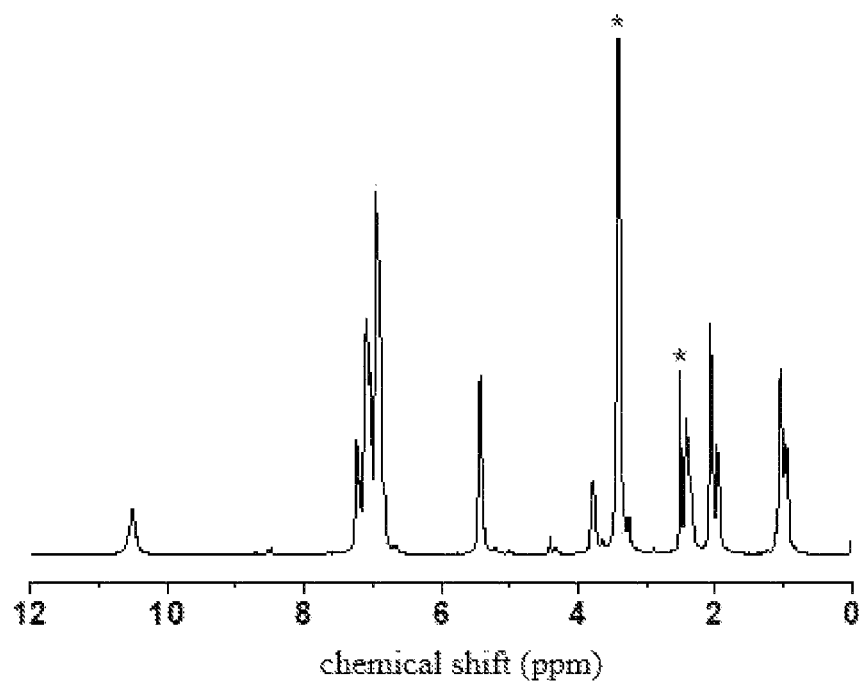

FIG. 9 is a comparison diagram showing the H-NMR spectrum in DMSO-$d_6$ of the thiocarbonyl-based poly(O-thiocarbamate) compound prepared in Example 21 (* represents the solvent peak).

Figure 10:
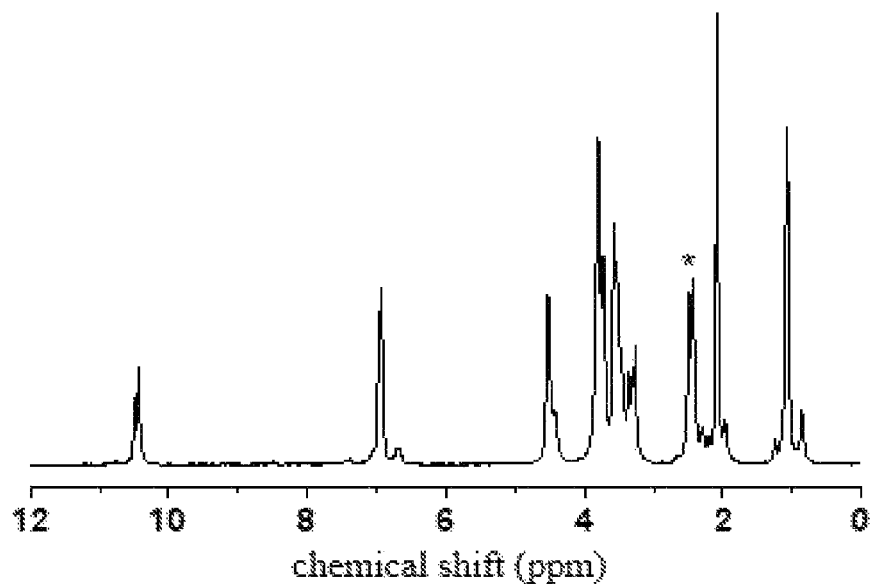

FIG. 10 is a comparison diagram showing the H-NMR spectrum in DMSO-$d_6$ of the thiocarbonyl-based poly(O-thiocarbamate) compound prepared in Example 22 (* represents the solvent peak).

Figure 11:
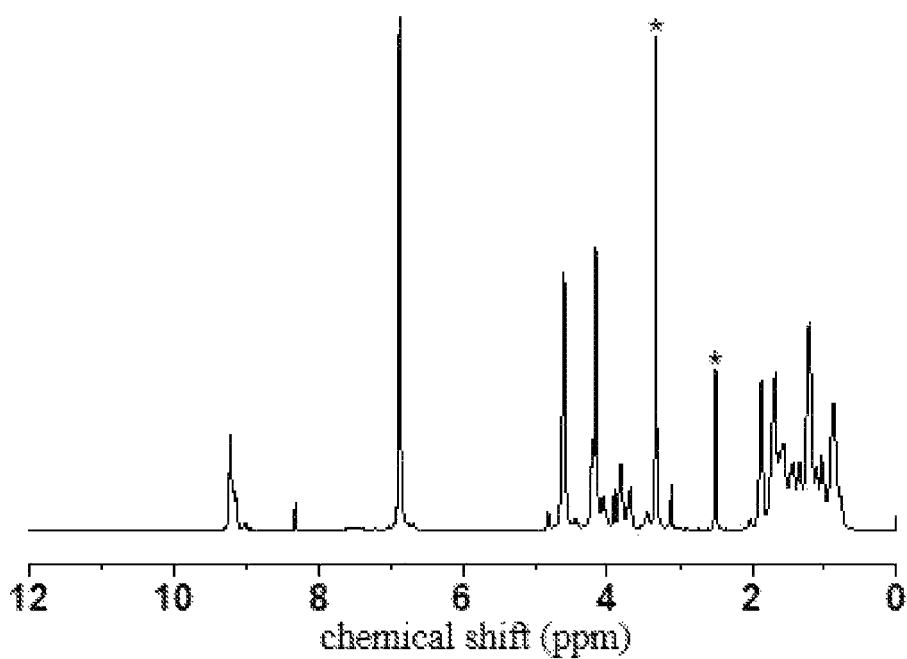

FIG. 11 is a comparison diagram showing the H-NMR spectrum in DMSO-$d_6$ of the thiocarbonyl-based poly(O-thiocarbamate) compound prepared in Example 23 (* represents the solvent peak).

DETAILED DESCRIPTION OF THE EMBODIMENTS

The present disclosure provides a thiocarbonyl-based poly(O-thiocarbamate) compound having a structure represented by Formula I:

Formula I

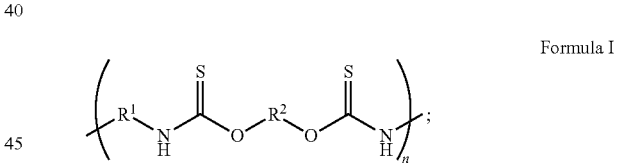

in formula I, n is an integer in a range of 2 to 430;
$R^1$ is any one selected from the group consisting of Formula 1 to Formula 19:

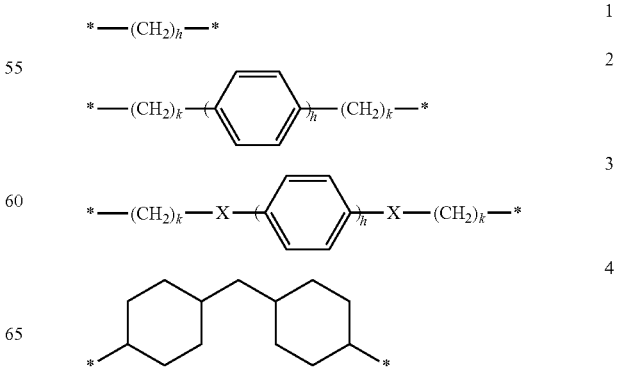

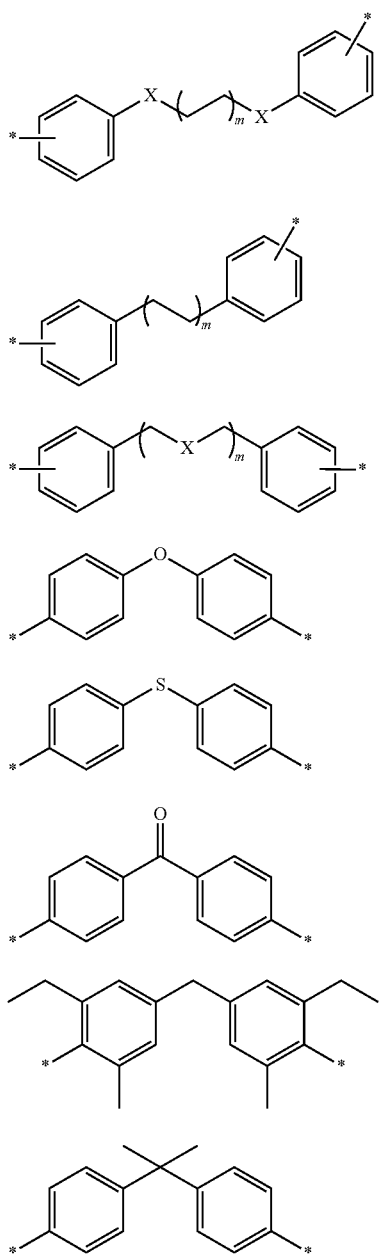
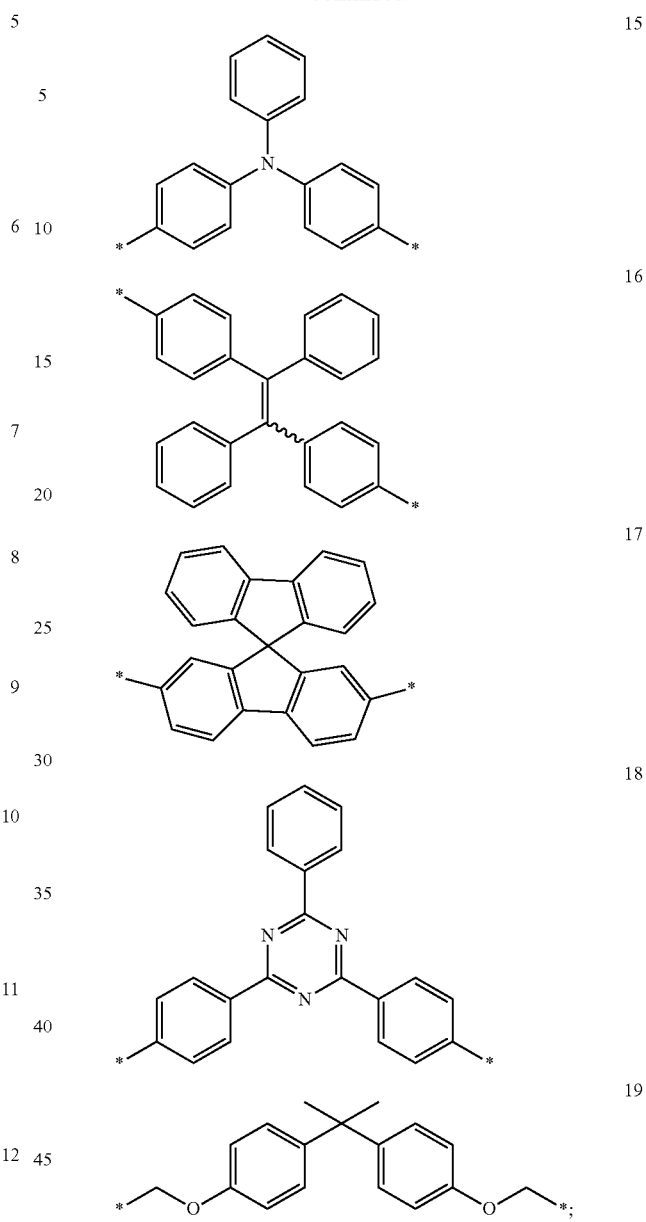
$R^2$ is any one selected from the group consisting of Formula 1 to Formula 4 and Formula 20 to Formula 26:
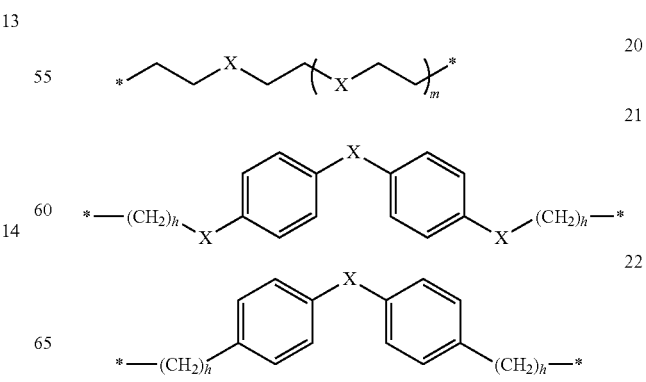

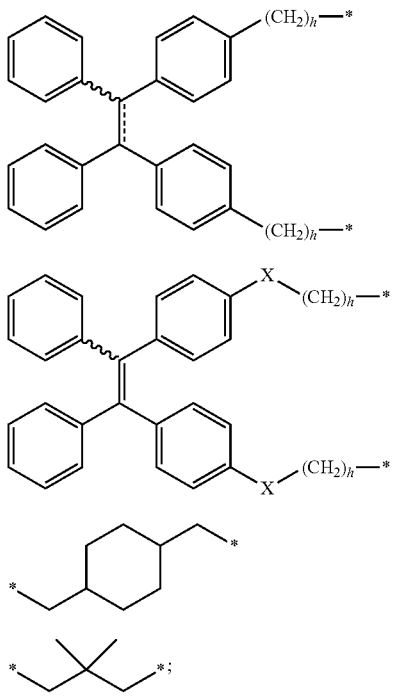

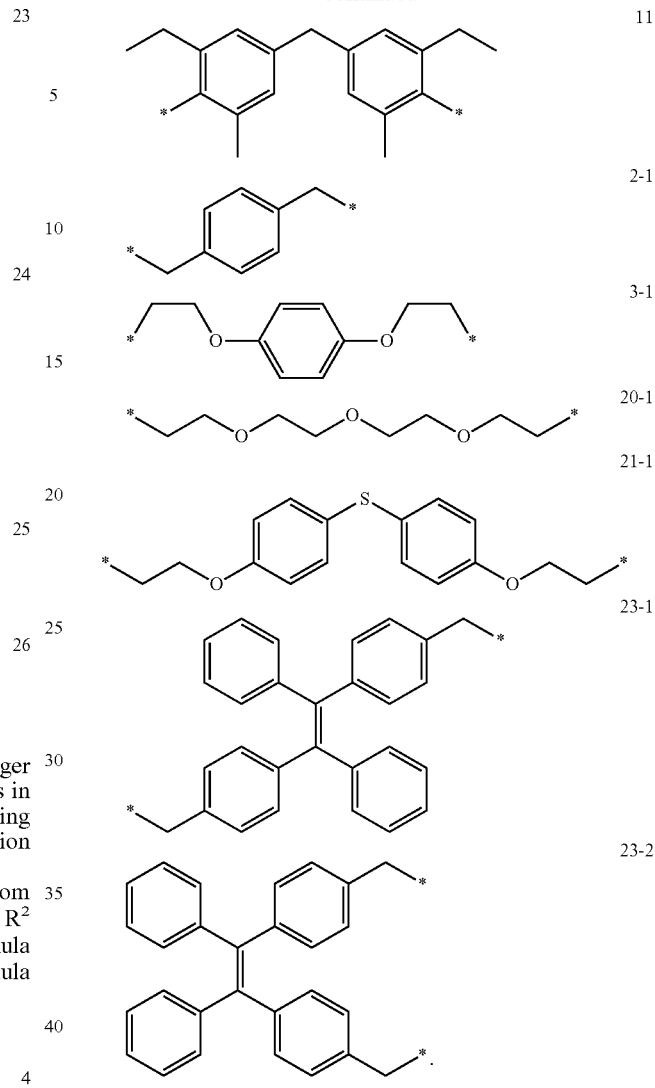

in Formula 1 to Formula 26, h is independently an integer in a range of 1 to 20, m and k are independently integers in a range of 0 to 20; X is selected from the group consisting of NH, PH, O, S and $SiH_2$; * represents a substitution position.

In the present disclosure, $R^1$ is preferably selected from the group consisting of Formula 4 and Formula 11, and $R^2$ is preferably selected from the group consisting of Formula 2-1, Formula 3-1, Formula 20-1, Formula 21-1, Formula 23-1 and Formula 23-2:

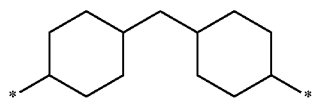

In the present disclosure, the structural formula of the thiocarbonyl-based poly(O-thiocarbamate) compound is any one of the following Formulas:

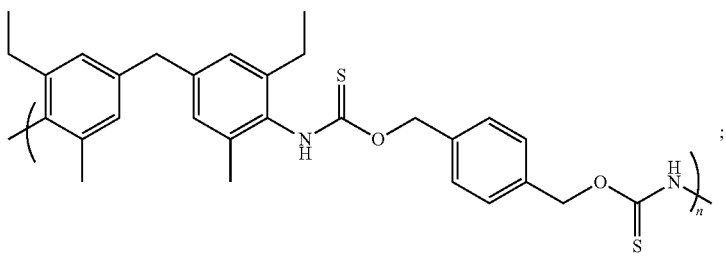

Formula I-1

Formula I-2
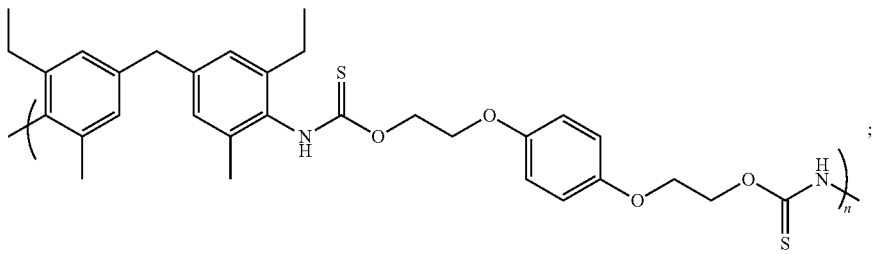
Formula I-3
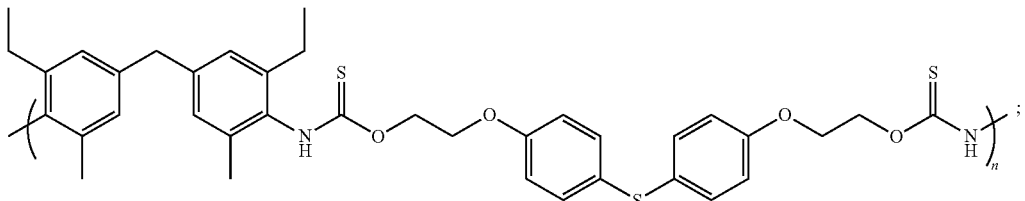
Formula I-4
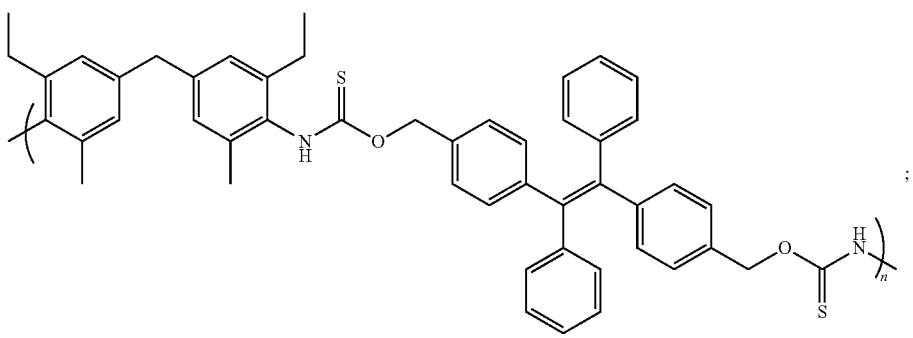
Formula I-5
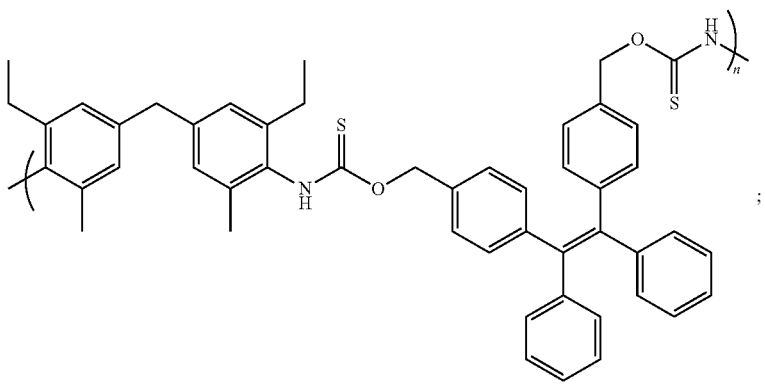
Formula I-6
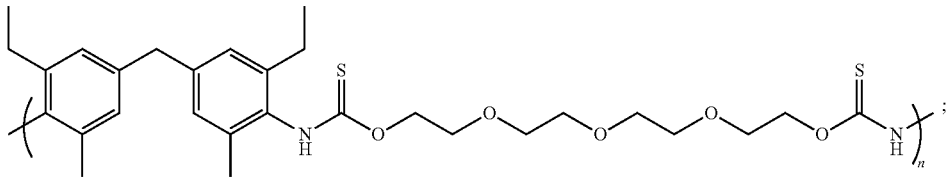
Formula I-7
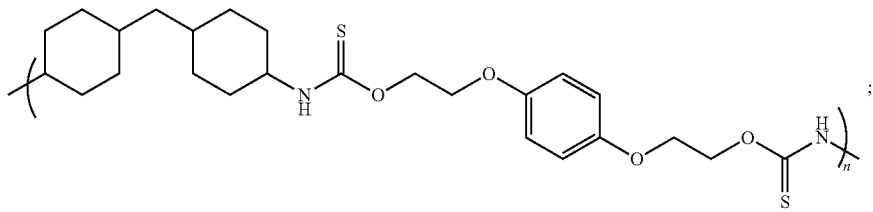

wherein n is an integer in a range of 2 to 430.

The present disclosure also provides a method for preparing the thiocarbonyl-based poly(O-thiocarbamate) compound described in the above technical schemes, comprising the following steps:

a bifunctional isocyanide compound, a diol compound and elemental sulfur are mixed in an organic solvent, and subjected to a polymerization reaction under a basic catalyst to obtain the thiocarbonyl-based poly(O-thiocarbamate) compound having the structure represented by Formula I;

the structural formula of the bifunctional isocyanide compound is represented by Formula II:

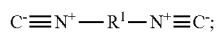

Formula II the structural formula of the diol compound is represented by Formula III:

HO—R²—OH         Formula III;

$R^1$ and $R^2$ are defined the same as those in the structure represented by Formula I.

In the present disclosure, unless otherwise specified, the raw materials used are all commercially available products in the art or compounds prepared by the conventional technical means in the art.

In the present disclosure, a molar ratio of the bifunctional isocyanide compound to the diol compound is preferably 1:1, and a molar ratio of the bifunctional isocyanide compound to elemental sulfur is preferably in a range of 1:2-1:4.

In the present disclosure, the amount-of-substance concentration of the bifunctional isocyanide compound in the reaction system is preferably in a range of 0.1-0.3 mol/L, and more preferably 0.2-0.3 mol/L.

In the present disclosure, the polymerization reaction is performed at a temperature of preferably 25-100° C., and more preferably 25-60° C., and the polymerization reaction is performed for preferably 0.5-6 h, and more preferably 0.5-4 h.

In the present disclosure, the organic solvent preferably comprises one or more selected from the group consisting of dimethyl sulfoxide, N,N-dimethylformamide, N,N-dimethylacetamide, N-methylpyrrolidone and tetrahydrofuran, and more preferably is N,N-dimethylformamide.

In the present disclosure, the basic catalyst is preferably an organic base or an inorganic base, and more preferably sodium hydride.

In the present disclosure, the basic catalyst preferably comprises one or more selected from the group consisting of 1,8-diazabicyclo[5.4.0]undec-7-ene, 1,4-diazabicyclo[2.2.2]octane, potassium hydroxide and sodium hydride, and more preferably is sodium hydride.

In the present disclosure, a molar ratio of the basic catalyst to the bifunctional isocyanide compound is preferably in a range of 2-5:1; the amount-of-substance concentration of the basic catalyst in the reaction system is preferably in a range of 0.4-1 mol/L.

In the present disclosure, the polymerization reaction is preferably performed in a nitrogen atmosphere.

After the polymerization reaction is completed, in the present disclosure, it is preferable to add chloroform to the reaction liquid for dilution and dissolution, and then the resulting solution is dropwise added into methanol, followed by standing, filtering and drying in turn to obtain the thiocarbonyl-based poly(O-thiocarbamate) compound. In the present disclosure, the amount of chloroform and the specific parameters of the standing, filtering and drying are not specially limited, and those well known to the skilled in the art may be used.

The present disclosure also provides use of the thiocarbonyl-based poly(O-thiocarbamate) compound described in the above technical schemes or the thiocarbonyl-based poly(O-thiocarbamate) compound prepared by the preparation method described in the above technical schemes in the field of optical materials.

In order to further illustrate the present disclosure, the thiocarbonyl-based poly(O-thiocarbamate) compound and the preparation method and use thereof as provided in the present disclosure will be described in detail below in conjunction with the examples, which should, however, not be understood as limitations to the protection scope of the present disclosure.

EXAMPLE 1

The bifunctional isocyanide compound had a structural formula represented by

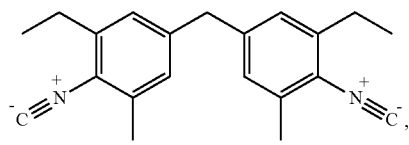

and could be synthesized according to the synthesis method described in the published literature of the applicant (Organic Letters, 2013, 44, 2562-2565.); the diol compound had a structural formula represented by

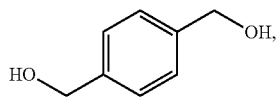

and could be purchased directly; elemental sulfur could be purchased directly; the prepared thiocarbonyl-based poly(O-thiocarbamate) compound had a structural formula represented by Formula I-1:

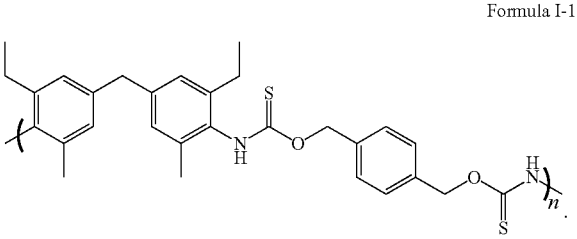

Formula I-1

The preparation process of the thiocarbonyl-based poly(O-thiocarbamate) compound was as follows:

19.2 mg (0.8 mmol) of sodium hydride, 25.6 mg (0.2 mmol) of elemental sulfur, 60.4 mg (0.2 mmol) of the bifunctional isocyanide compound and 27.6 mg (0.2 mmol) of the diol compound were added into a 10 mL polymerization tube in sequence. The tube was vacuumized and displaced with nitrogen for 3 times, and 1 mL of N,N-dimethylformamide (DMF) was injected thereto with a syringe. The polymerization tube was placed in an oil bath at 55° C. for a reaction for 1 h.

The reaction formula was shown as follows:

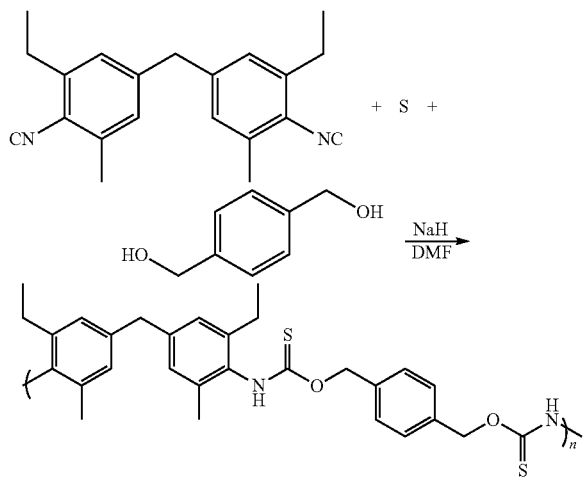

After the reaction was completed, 2 mL of chloroform was added into the reaction liquid for dilution and dissolution, and the resulted solution was added dropwise into methanol under rapid stirring (800 rpm), followed by standing, filtering and drying, obtaining a thiocarbonyl-based poly(O-thiocarbamate) compound with the structure represented by Formula I-1.

By detecting and analyzing, the yield of the product thiocarbonyl-based poly(O-thiocarbamate) compound was 90%, the $M_w$ was 24,600, and the molecular weight distribution was 1.73.

Figure 1:
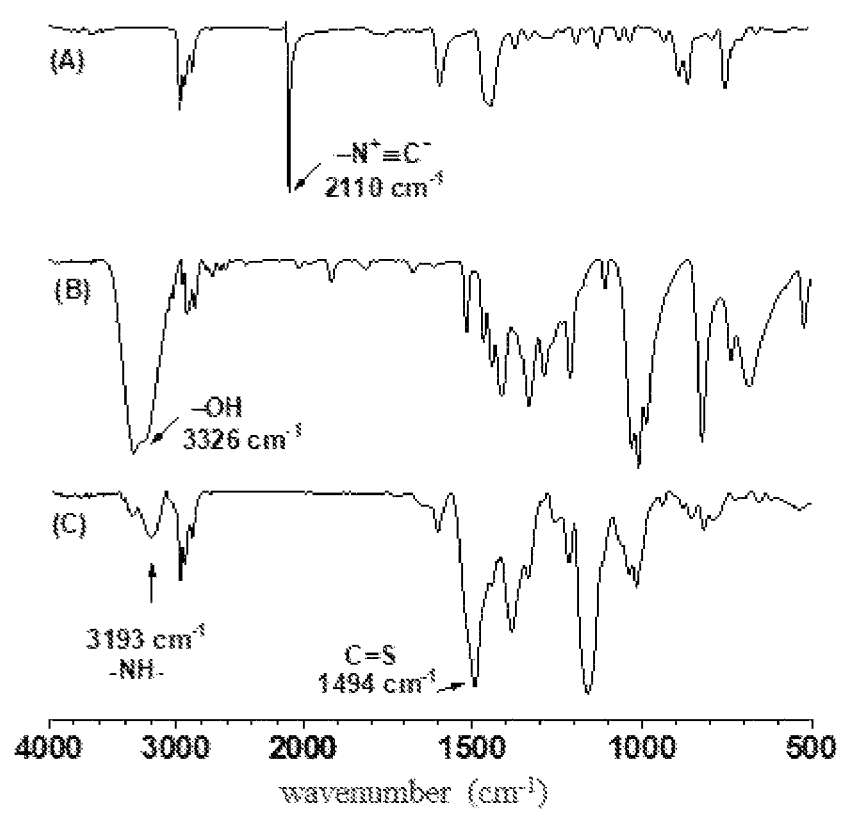
FIG. 1 shows the infrared absorption spectrums of the thiocarbonyl-based poly(O-thiocarbamate) compound and its corresponding monomers in Example 1; wherein (A) is the infrared absorption spectrum of the monomer

FIG. 1 shows the infrared absorption spectrum of the thiocarbonyl-based poly(O-thiocarbamate) compound (FIG. 1 (C)) and its corresponding monomers of the diol compound (FIG. 1 (B)) and the bifunctional isocyanide compound (FIG. 1 (A)). The stretching vibration peaks at 2110 $cm^{-1}$ and 3326 $cm^{-1}$ that correspond to the carbon-nitrogen triple bonds and alcoholic hydroxyl groups of the monomers basically disappear in the infrared spectrum of the thiocarbonyl-based poly(O-thiocarbamate) compound, indicating that the reaction is substantially completed, and the peak at 1494 $cm^{-1}$ corresponds to the vibration peak of the carbon-sulfur double bonds in the thiocarbonyl-based poly(O-thiocarbamate) compound.

The comparison diagrams of the NMR spectrums of the thiocarbonyl-based poly(O-thiocarbamate) compound and its corresponding monomers (* represents the solvent peak) are shown in FIG. 2 and FIG. 3. From the figures, it can be determined that the polymer is a thiocarbonyl-based poly(O-thiocarbamate) compound. The chemical shift at 10.5 ppm in FIG. 2 and the chemical shifts at 188.2 ppm and 189.7 ppm in FIG. 3 correspond to the characteristic hydrogen peaks of amine and characteristic carbon peaks of thiocarbonyl in the thiocarbonyl-based poly(O-thiocarbamate) compound, respectively; at the same time, the characteristic peak of hydroxyl hydrogen of the diol compound corresponding to the chemical shift at 5.1 ppm in FIG. 2 and the characteristic peak of carbon on the carbon-nitrogen triple bonds of the bifunctional isocyanide compound corresponding to the chemical shift at 168.0 ppm in FIG. 3 both disappear in the spectrum of the polymer, indicating that the monomers are reacted completely.

It can be seen from FIG. 4 that the temperature for 5% thermal weight loss of the thiocarbonyl-based poly(O-thiocarbamate) compound is 248° C., which indicates that the thiocarbonyl-based poly(O-thiocarbamate) compound has good thermal stability; the thiocarbonyl-based poly(O-thiocarbamate) compound is easily soluble in common organic solvents such as dichloromethane, chloroform, tetrahydrofuran, dimethyl sulfoxide, N,N-dimethylformamide, N,N-dimethylacetamide and N-methylpyrrolidone at room temperature, which indicates that it has excellent processability.

EXAMPLES 2-3

Examples 2-3 investigated the influence of different monomer (bifunctional isocyanide compound) concentrations on the polymerization reaction. The types of raw materials and the polymerization process were the same as those in Example 1, and the results were shown in Table 1. The results show that when the bifunctional isocyanide compound and the diol compound in the reaction system have an amount-of-substance concentration in a range of 0.1-0.3 mol/L, the polymerization reaction can all be completed.

TABLE 1

The influence of different monomer concentrations on the polymerization reaction

| Example | bifunctional isocyanide compound (mmol) | diol compound (mmol) | elemental sulfur (mmol) | yield (%) | $M_w$ | molecular weight distribution |
|---|---|---|---|---|---|---|
| 2 | 0.1 | 0.1 | 0.4 | 51 | 4000 | 1.19 |
| 3 | 0.3 | 0.3 | 1.2 | 64 | 7800 | 1.44 |

EXAMPLES 4-6

Examples 4-6 investigated the influence of different catalyst concentrations on the polymerization reaction. The types of raw materials and the polymerization process were the same as those in Example 1, and the results were shown in Table 2. The results show that when the catalyst in the reaction system has an amount-of-substance concentration in a range of 0.4-1.0 mol/L, the polymerization reaction can all be completed.

TABLE 2

The influence of different catalyst concentrations on the polymerization reaction

| Example | catalyst dosage (mmol) | yield (%) | $M_w$ | molecular weight distribution |
|---|---|---|---|---|
| 4 | 0.4 | 53 | 1500 | 1.47 |
| 5 | 0.6 | 77 | 8200 | 1.46 |
| 6 | 1.0 | 57 | 2600 | 1.62 |

EXAMPLES 7-9

Examples 7-9 investigated the influence of different temperatures on the polymerization reaction. The types of raw materials and the polymerization process were the same as those in Example 1, and the results were shown in Table 3. The results show that when the reaction temperature is in the range of 25-60° C., the polymerization reaction can all be carried out.

TABLE 3

The influence of different temperatures on the polymerization reaction

| Example | reaction temperature (° C.) | yield (%) | $M_w$ | molecular weight distribution |
|---|---|---|---|---|
| 7 | 25 | 52 | 4300 | 1.23 |
| 8 | 40 | 78 | 10000 | 1.55 |
| 9 | 60 | 90 | 12200 | 1.62 |

EXAMPLES 10-13

Examples 10-13 investigated the influence of different reaction time on the polymerization reaction. The types of raw materials and the polymerization process were the same as those in Example 1, and the results were shown in Table 4. The results show that when the reaction time is in the range of 0.5-6 h, the polymerization reaction can all be carried out.

TABLE 4

The influence of different reaction time on the polymerization reaction

| Example | reaction time (h) | yield (%) | $M_w$ | molecular weight distribution |
|---|---|---|---|---|
| 10 | 0.5 | 56 | 4200 | 1.21 |
| 11 | 2 | 92 | 13400 | 1.69 |
| 12 | 3 | 81 | 9800 | 1.57 |
| 13 | 6 | 82 | 9600 | 1.53 |

EXAMPLES 14-15

Examples 14-15 investigated the influence of different catalyst types on the polymerization reaction. The types of raw materials and the polymerization process were the same as those in Example 1, and the results were shown in Table 5. The results show that when the catalyst is changed to potassium hydroxide or diazabicyclo compounds, the polymerization reaction can still be carried out. However, the effects are inferior to the result when sodium hydride is used as the catalyst in Example 1.

TABLE 5

The influence of different catalyst types on the polymerization reaction

| Example | catalyst | yield (%) | $M_w$ | molecular weight distribution |
|---|---|---|---|---|
| 14 | potassium hydroxide | 53 | 4000 | 1.24 |
| 15 | diazabicyclo compound | 50 | 3500 | 1.26 |

EXAMPLES 16-17

Examples 16-17 investigated the influence of different solvent types on the polymerization reaction. The types of raw materials and the polymerization process were the same as those in Example 1, and the results were shown in Table 6. The results show that both tetrahydrofuran and dimethyl sulfoxide can be used as the solvent of the polymerization reaction.

TABLE 6

The influence of different solvent types on the polymerization reaction

| Example | solvent | yield (%) | $M_w$ | molecular weight distribution |
|---|---|---|---|---|
| 16 | tetrahydrofuran | 93 | 14300 | 1.45 |
| 17 | dimethyl sulfoxide | 39 | 2200 | 1.27 |

EXAMPLE 18

The bifunctional isocyanide compound had a structural formula represented by

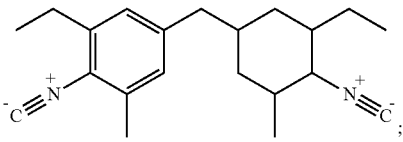

the diol compound had a structural formula represented by

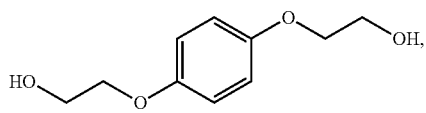 [SMILES: OCCOc1ccc(OCCO)cc1]

and could be purchased directly; elemental sulfur could be purchased directly; the prepared thiocarbonyl-based poly(O-thiocarbamate) compound had a structural formula represented by Formula I-2:

Formula I-2

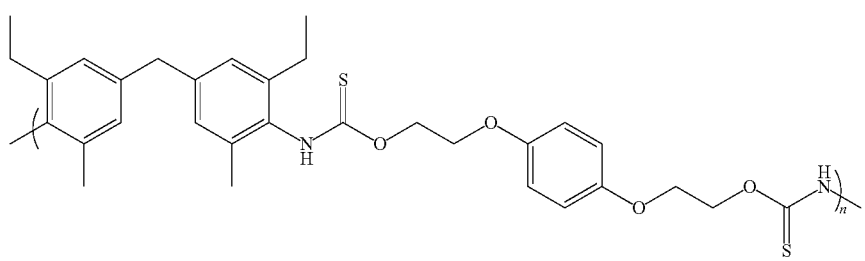

The preparation process of the thiocarbonyl-based poly(O-thiocarbamate) compound was as follows:

19.2 mg (0.8 mmol) of sodium hydride, 25.6 mg (0.2 mmol) of elemental sulfur, 60.4 mg (0.2 mmol) of the bifunctional isocyanide compound and 39.6 mg (0.2 mmol) of the diol compound were added into a 10 mL polymerization tube. The tube was vacuumized and displaced with nitrogen for 3 times, and 1 mL of DMF was injected thereto with a syringe. The temperature was increased to 55° C. and the reaction was carried out for 1 h.

The reaction formula was shown as follows:

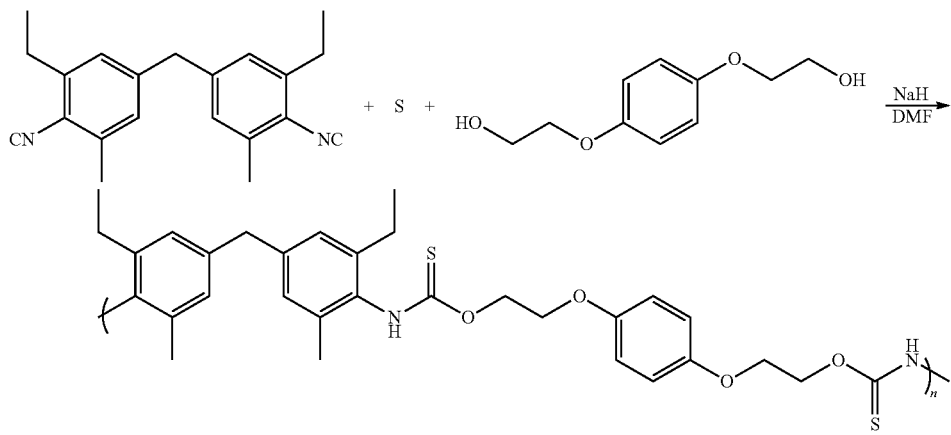

After the reaction was completed, 2 mL of chloroform was added into the reaction liquid for dilution and dissolution, and the resulted solution was added dropwise into methanol under rapid stirring (800 rpm), followed by standing, filtering and drying, obtaining a thiocarbonyl-based poly(O-thiocarbamate) compound with the structure represented by Formula I-2.

By detecting and analyzing, the yield of the product thiocarbonyl-based poly(O-thiocarbamate) compound was 91%, the $M_w$ was 27,600, and the molecular weight distribution was 1.65.

The H-NMR spectrum of the thiocarbonyl-based poly(O-thiocarbamate) compound is shown in FIG. 5. It can be determined from FIG. 5 that the polymer is a thiocarbonyl-based poly(O-thiocarbamate) compound. The thiocarbonyl-based poly(O-thiocarbamate) compound is easily soluble in common organic solvents such as dichloromethane, chloroform, tetrahydrofuran, dimethyl sulfoxide, N,N-dimethylformamide, N,N-dimethylacetamide and N-methylpyrrolidone at room temperature, which indicates that it has excellent processability.

EXAMPLE 19

The bifunctional isocyanide compound had a structural formula represented by

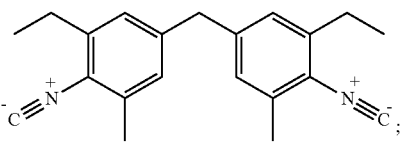

the diol compound had a structural formula represented by

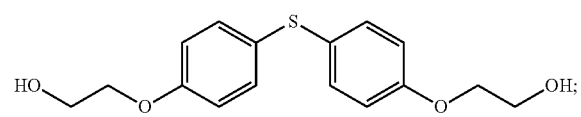 [SMILES: OCCOc1ccc(Sc2ccc(OCCO)cc2)cc1]

elemental sulfur could be purchased directly; the prepared thiocarbonyl-based poly(O-thiocarbamate) had a structural formula represented by Formula I-3:

Formula I-3

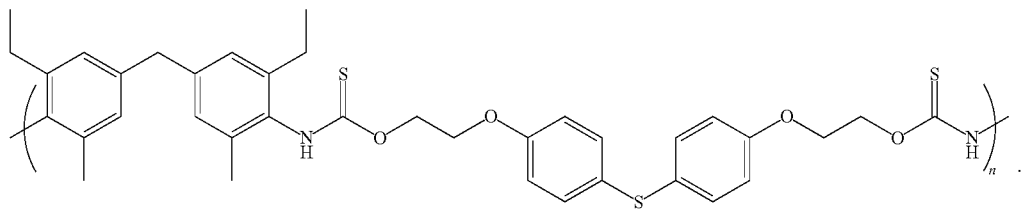

The preparation process of the thiocarbonyl-based poly (O-thiocarbamate) compound was as follows:

19.2 mg (0.8 mmol) of sodium hydride, 25.6 mg (0.2 mmol) of elemental sulfur, 60.4 mg (0.2 mmol) of the bifunctional isocyanide compound and 61.2 mg (0.2 mmol) of the diol compound were added into a 10 mL polymerization tube. The tube was vacuumized and displaced with nitrogen for 3 times, and 1 mL of DMF was injected thereto with a syringe. The temperature was increased to 55° C. and the reaction was carried out for 1 h.

The reaction formula was shown as follows:

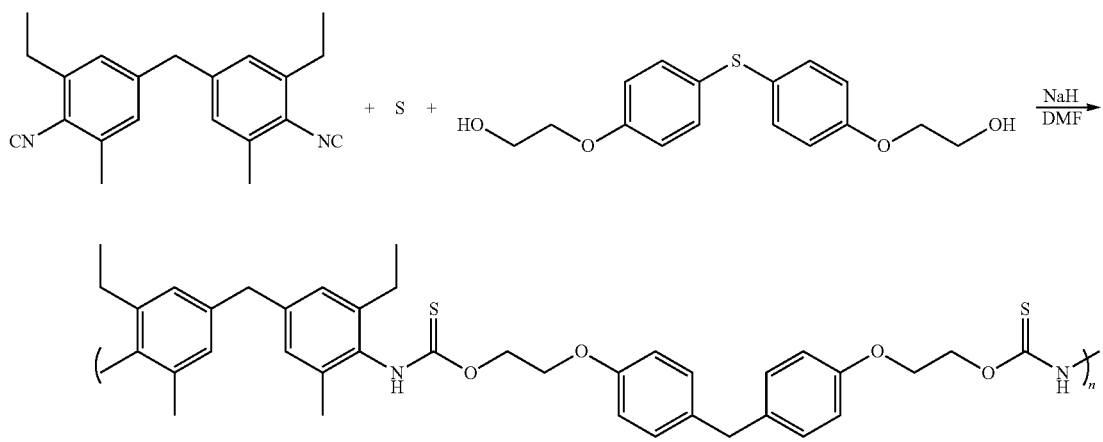

After the reaction was completed, 2 mL of chloroform was added into the reaction liquid for dilution and dissolution, and the resulted solution was added dropwise into methanol under rapid stirring (800 rpm), followed by standing, filtering and drying, obtaining a thiocarbonyl-based poly(O-thiocarbamate) compound with the structure represent by Formula I-3.

By detecting and analyzing, the yield of the product thiocarbonyl-based poly(O-thiocarbamate) compound was 90%, the $M_w$ was 26,400, and the molecular weight distribution was 1.57.

The H-NMR spectrum of the thiocarbonyl-based poly(O-thiocarbamate) compound is shown in FIG. 6. It can be determined from FIG. 6 that the polymer is a thiocarbonyl-based poly(O-thiocarbamate) compound. The thiocarbonyl-based poly(O-thiocarbamate) compound is easily soluble in common organic solvents such as dichloromethane, chloroform, tetrahydrofuran, dimethyl sulfoxide, N,N-dimethylformamide, N,N-dimethylacetamide and N-methylpyrrolidone at room temperature, which indicates that it has excellent processability. It can be seen from FIG. 7 that the thiocarbonyl-based poly(O-thiocarbamate) compound has a refractive index higher than 1.73 within a range of 600-1700 nm, which indicates that it has a very high refractive index and is expected to have desirable application prospects in the optical field.

EXAMPLE 20

The bifunctional isocyanide compound had a structural formula represented by

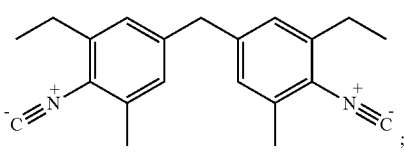

the diol compound had a structural formula represented by

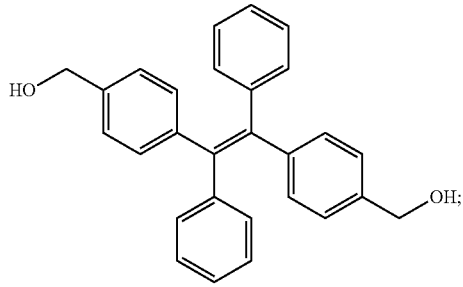 [SMILES: OCc1ccc(/C(=C(\c2ccccc2)c2ccc(CO)cc2)c2ccccc2)cc1]

elemental sulfur could be purchased directly; the prepared thiocarbonyl-based poly(O-thiocarbamate) compound had a structural formula represented by Formula I-4:

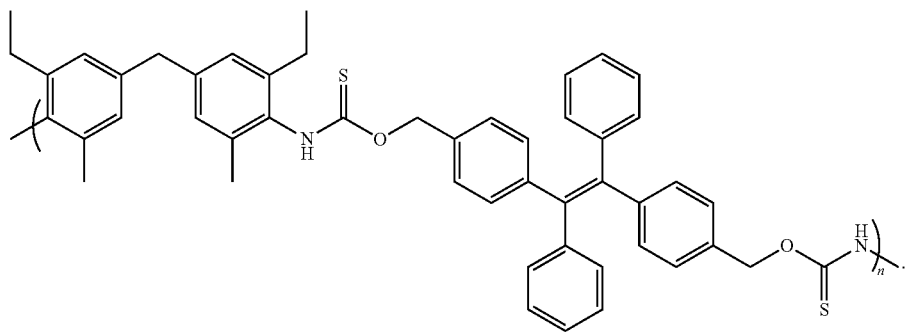

Formula I-4

The preparation process of the thiocarbonyl-based poly(O-thiocarbamate) compound was as follows:

19.2 mg (0.8 mmol) of sodium hydride, 25.6 mg (0.2 mmol) of elemental sulfur, 60.4 mg (0.2 mmol) of the bifunctional isocyanide compound and 78.4 mg (0.2 mmol) of the diol compound were added into a 10 mL polymerization tube. The tube was vacuumized and displaced with nitrogen for 3 times, and 1 mL of DMF was injected thereto with a syringe. The temperature was increased to 55° C. and the reaction was carried out for 1 h.

The reaction formula was shown as follows:

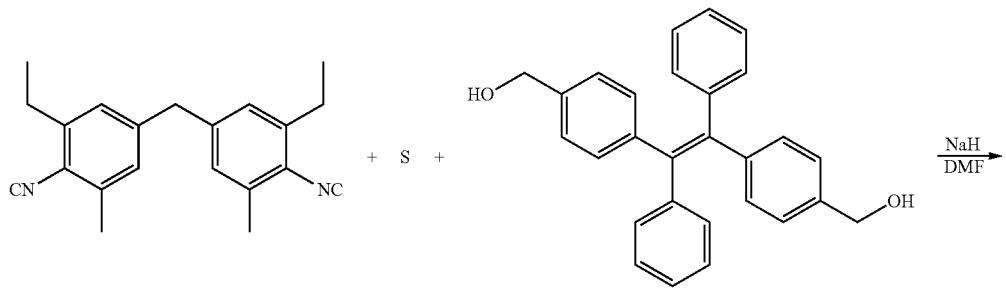

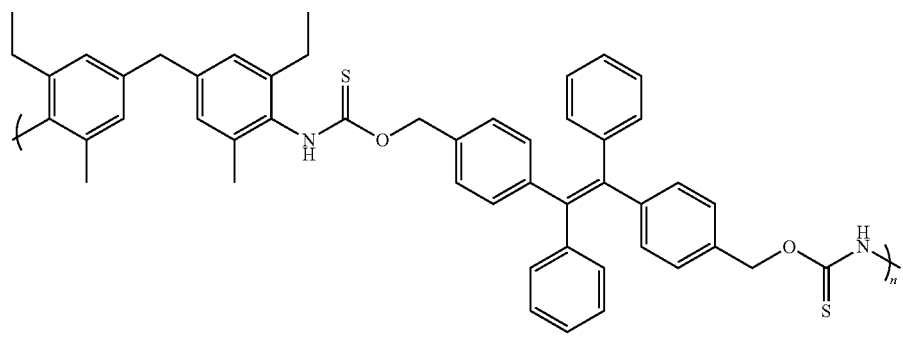

After the reaction was completed, 2 mL of chloroform was added into the reaction liquid for dilution and dissolution, and the resulted solution was added dropwise into methanol under rapid stirring (800 rpm), followed by standing, filtering and drying, obtaining a thiocarbonyl-based poly(O-thiocarbamate) compound with the structure represented by Formula I-4.

By detecting and analyzing, the yield of the product thiocarbonyl-based poly(O-thiocarbamate) compound was 87%, the $M_w$ was 23,900, and the molecular weight distribution was 1.80.

The H-NMR spectrum of the thiocarbonyl-based poly(O-thiocarbamate) compound is shown in FIG. 8. It can be determined from FIG. 8 that the polymer is a thiocarbonyl-based poly(O-thiocarbamate) compound. The thiocarbonyl-based poly(O-thiocarbamate) compound is easily soluble in common organic solvents such as dichloromethane, chloroform, tetrahydrofuran, dimethyl sulfoxide, N,N-dimethylformamide, N,N-dimethylacetamide and N-methylpyrrolidone at room temperature, which indicates that it has excellent processability.

EXAMPLE 21

The bifunctional isocyanide compound had a structural formula represented by

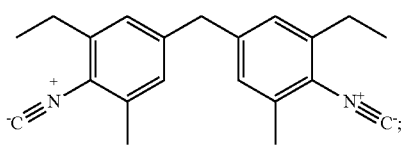

the diol compound had a structural formula represented by

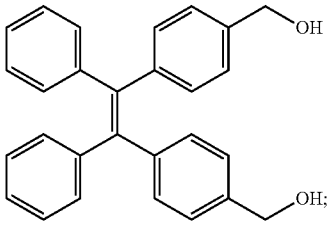 [SMILES: OCc1ccc(/C(=C(/c2ccccc2)c2ccc(CO)cc2)c2ccccc2)cc1]

elemental sulfur could be purchased directly; the prepared thiocarbonyl-based poly(O-thiocarbamate) compound had a structural formula represented by Formula I-5:

Formula I-5

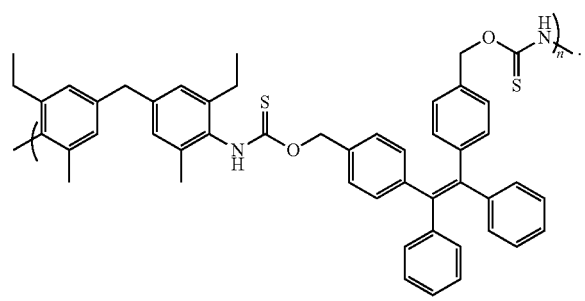

The preparation process of the thiocarbonyl-based poly (O-thiocarbamate) compound was as follows:

19.2 mg (0.8 mmol) of sodium hydride, 25.6 mg (0.2 mmol) of elemental sulfur, 60.4 mg (0.2 mmol) of the bifunctional isocyanide compound and 78.4 mg (0.2 mmol) of the diol compound were added into a 10 mL polymerization tube. The tube was vacuumized and displaced with nitrogen for 3 times, and 1 mL of DMF was injected thereto with a syringe. The temperature was increased to 55° C. and the reaction was carried out for 1 h.

The reaction formula was shown as follows:

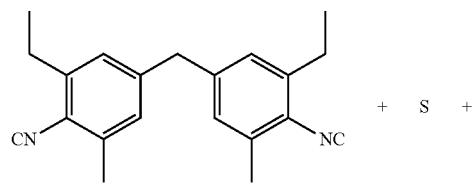

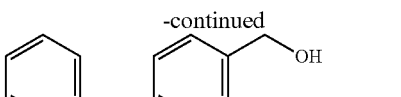

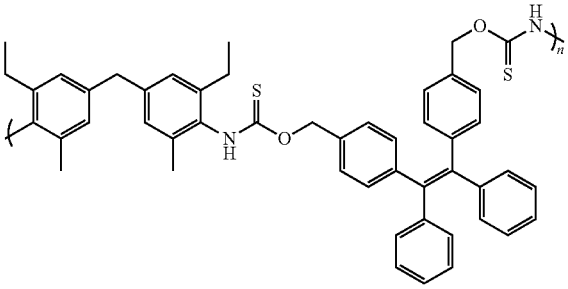

After the reaction was completed, 2 mL of chloroform was added into the reaction liquid for dilution and dissolution, and the resulted solution was added dropwise into methanol under rapid stirring (800 rpm), followed by standing, filtering and drying, obtaining a thiocarbonyl-based poly(O-thiocarbamate) compound with the structure represented by Formula I-5.

By detecting and analyzing, the yield of the product thiocarbonyl-based poly(O-thiocarbamate) compound was 87%, the $M_w$ was 23,900, and the molecular weight distribution was 1.80.

The H-NMR spectrum of the thiocarbonyl-based poly(O-thiocarbamate) compound is shown in FIG. 9. It can be determined from FIG. 9 that the polymer is a thiocarbonyl-based poly(O-thiocarbamate) compound. The thiocarbonyl-based poly(O-thiocarbamate) compound is easily soluble in common organic solvents such as dichloromethane, chloroform, tetrahydrofuran, dimethyl sulfoxide, N,N-dimethylformamide, N,N-dimethylacetamide and N-methylpyrrolidone at room temperature, which indicates that it has excellent processability.

EXAMPLE 22

The bifunctional isocyanide compound had a structural formula represented by

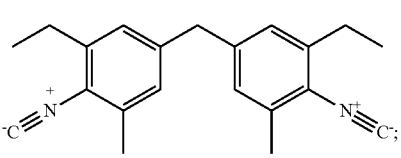

the diol compound had a structural formula represented by

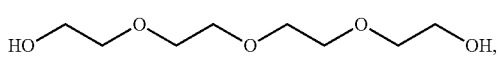

and could be purchased directly; elemental sulfur could be purchased directly; the prepared thiocarbonyl-based poly(O-thiocarbamate) compound had a structural formula represented by Formula I-6:

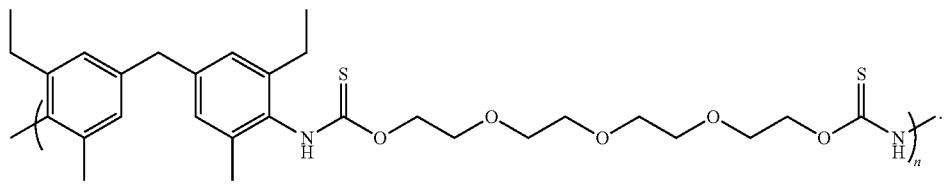

Formula I-6

The preparation process of the thiocarbonyl-based poly(O-thiocarbamate) compound was as follows:

19.2 mg (0.8 mmol) of sodium hydride, 25.6 mg (0.2 mmol) of elemental sulfur, 60.4 mg (0.2 mmol) of the bifunctional isocyanide compound and 78.4 mg (0.2 mmol) of the diol compound were added into a 10 mL polymerization tube. The tube was vacuumized and displaced with nitrogen for 3 times, and 1 mL of DMF was injected thereto with a syringe. The temperature was increased to 55° C. and the reaction was carried out for 1 h.

The reaction formula was shown as follows:

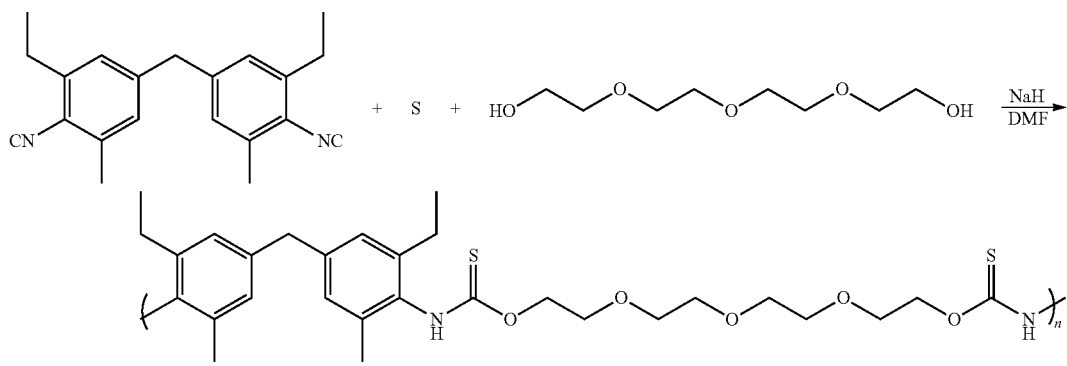

After the reaction was completed, 2 mL of chloroform was added into the reaction liquid for dilution and dissolution, and the resulted solution was added dropwise into methanol under rapid stirring (800 rpm), followed by standing, filtering and drying, obtaining a thiocarbonyl-based poly(O-thiocarbamate) compound with the structure represented by Formula 1-6.

By detecting and analyzing, the yield of the product thiocarbonyl-based poly(O-thiocarbamate) compound was 95%, the $M_w$ was 53,100, and the molecular weight distribution was 2.00.

The H-NMR spectrum of the thiocarbonyl-based poly(O-thiocarbamate) compound is shown in FIG. 10. It can be determined from FIG. 10 that the polymer is a thiocarbonyl-based poly(O-thiocarbamate) compound. The thiocarbonyl-based poly(O-thiocarbamate) compound is easily soluble in common organic solvents such as dichloromethane, chloroform, tetrahydrofuran, dimethyl sulfoxide, N,N-dimethylformamide, N,N-dimethylacetamide and N-methylpyrrolidone at room temperature, which indicates that it has excellent processability.

EXAMPLE 23

The bifunctional isocyanide compound had a structural formula represented by

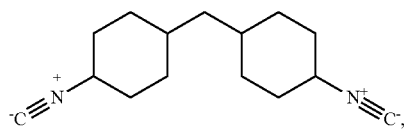

and could be synthesized according to the synthesis method in the published literature (Phosphorus Sulfur & Silicon & the Related Elements, 2009, 184, 1880-1903); the diol compound had a structural formula represented by

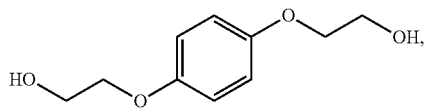 [SMILES: OCCOc1ccc(OCCO)cc1]

and could be purchased directly; elemental sulfur could be purchased directly; the prepared thiocarbonyl-based poly(O-thiocarbamate) compound had a structural formula represented by Formula I-7:

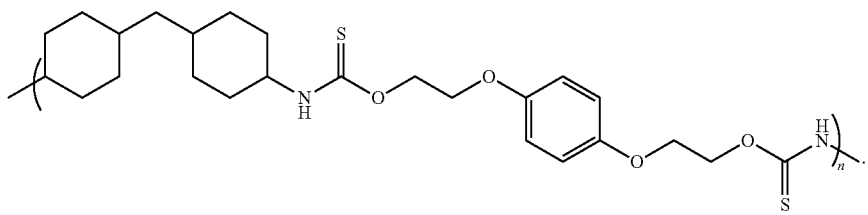

Formula I-7

The preparation process of the thiocarbonyl-based poly(O-thiocarbamate) compound was as follows:

19.2 mg (0.8 mmol) of sodium hydride, 25.6 mg (0.2 mmol) of elemental sulfur, 60.4 mg (0.2 mmol) of the bifunctional isocyanide compound and 39.6 mg (0.2 mmol) of the diol compound were added into a 10 mL polymerization tube. The tube was vacuumized and displaced with nitrogen for 3 times, and 1 mL of DMF was injected thereto with a syringe. The temperature was increased to 55° C. and the reaction was carried out for 1 h.

The reaction formula was shown as follows:

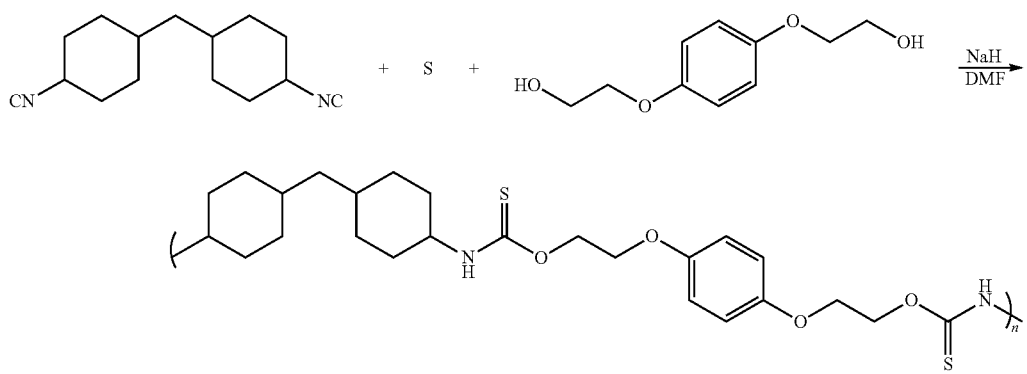

After the reaction was completed, 2 mL of chloroform was added into the reaction liquid for dilution and dissolution, and the resulted solution was added dropwise into methanol under rapid stirring (800 rpm), followed by standing, filtering and drying, obtaining a thiocarbonyl-based poly(O-thiocarbamate) compound with the structure represented by Formula I7.

By detecting and analyzing, the yield of the product thiocarbonyl-based poly(O-thiocarbamate) compound was 81%, the $M_w$ was 13,400, and the molecular weight distribution was 1.56.

The H-NMR spectrum of the thiocarbonyl-based poly(O-thiocarbamate) compound is shown in FIG. 11. It can be determined from FIG. 11 that the polymer is a thiocarbonyl-based poly(O-thiocarbamate) compound. The thiocarbonyl-based poly(O-thiocarbamate) compound is easily soluble in common organic solvents such as dichloromethane, chloroform, tetrahydrofuran, dimethyl sulfoxide, N,N-dimethylformamide, N,N-dimethylacetamide and N-methylpyrrolidone at room temperature, which indicates that it has excellent processability.

The description of the above embodiments is only used to help understand the method and the core idea of the present disclosure. It should be pointed out that for those ordinary skilled in the art, without departing from the principle of the present disclosure, several improvements and modifications could be made to the present disclosure, and these improvements and modifications also fall within the protection scope of the claims of the present disclosure. Various modifications to these embodiments are obvious to those skilled in the art, and the general principles defined herein could be implemented in other embodiments without departing from the spirit or scope of the present disclosure. Therefore, the present disclosure will not be limited to the embodiments shown herein, but should conform to the widest scope consistent with the principles and novel features disclosed herein.

What is claimed is:

1. A thiocarbonyl-based poly(O-thiocarbamate) compound having a structure represented by Formula I:

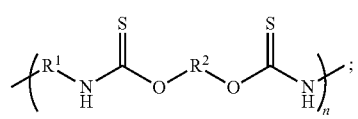

Formula I wherein in Formula I, n is an integer in a range of 2 to 430; and $R^1$ is selected from the group consisting of Formula 4 and Formula 11, and $R^2$ is selected from the group consisting of Formula 2-1, Formula 3-1, Formula 20-1, Formula 21-1, Formula 23-1 and Formula 23-2:

4

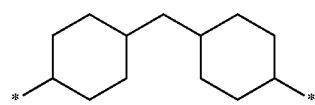

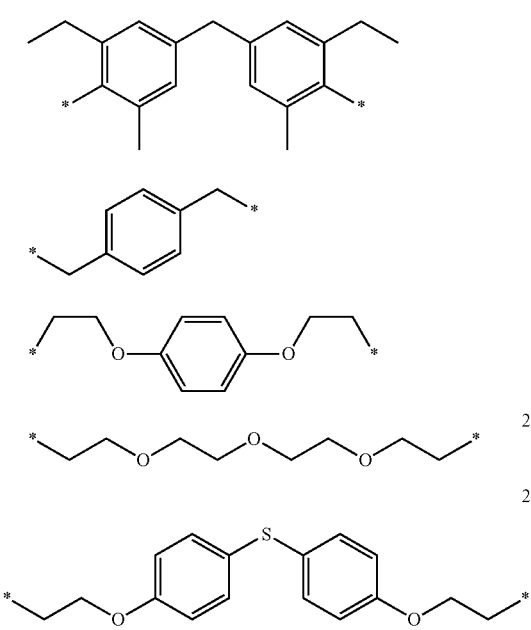

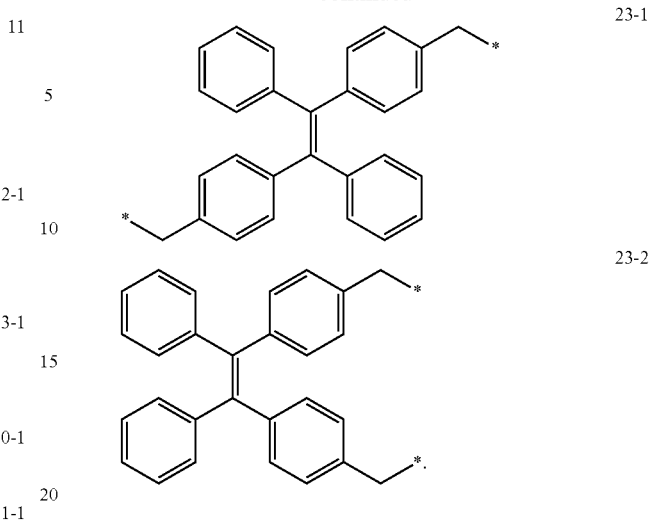

wherein in Formula 4, Formula 11, Formula 2-1, Formula 3-1, Formula 20-1, Formula 21-1, Formula 23-1, and Formula 23-2, * represents a substitution position.

2. The thiocarbonyl-based poly(O-thiocarbamate) compound of claim 1, wherein a structural formula of the thiocarbonyl-based poly(O-thiocarbamate) compound is any one selected from the group consisting of Formula I-1 to Formula I-7:

Formula I-1

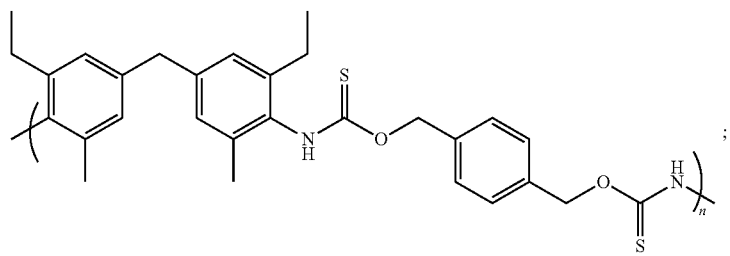

Formula I-2

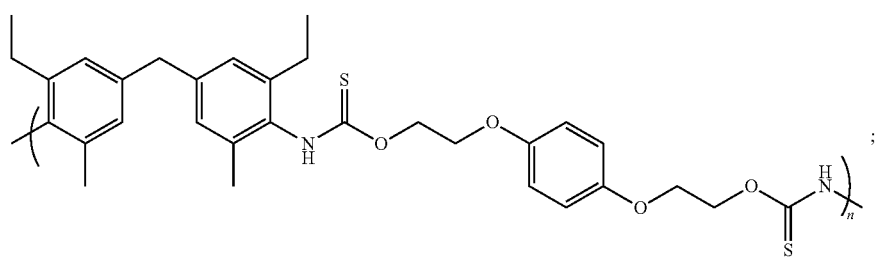

Formula I-3

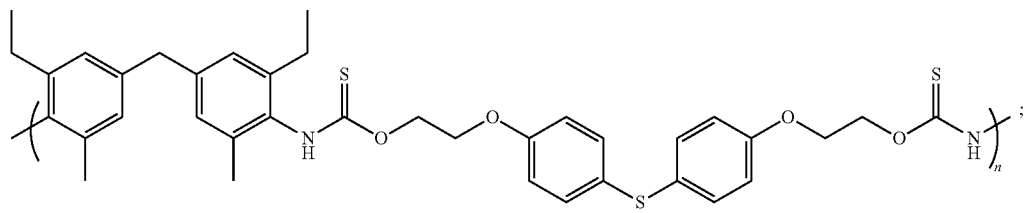

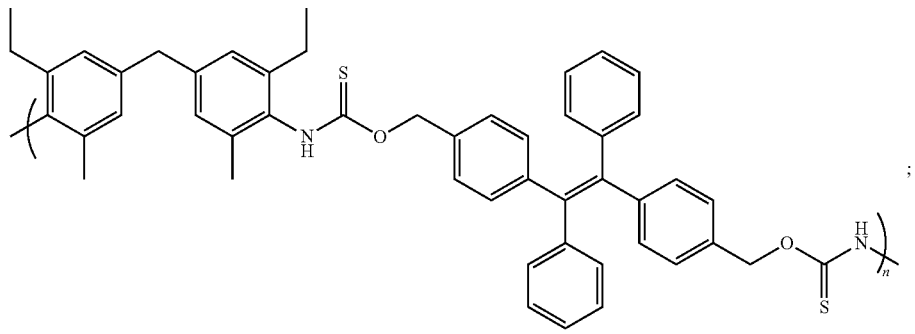
Formula I-4
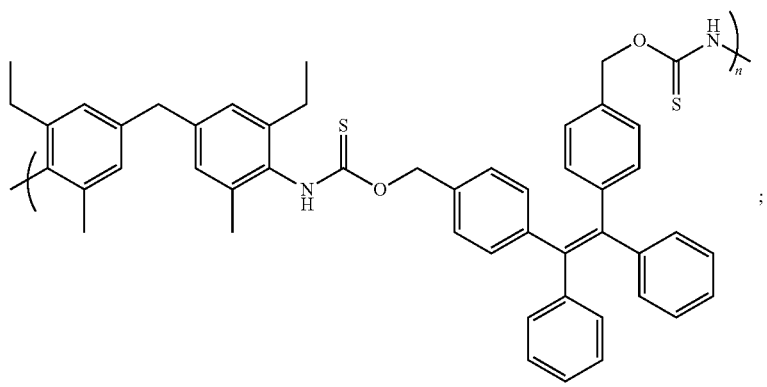
Formula I-5
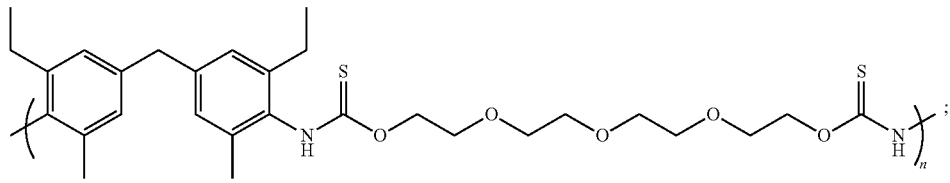
Formula I-6
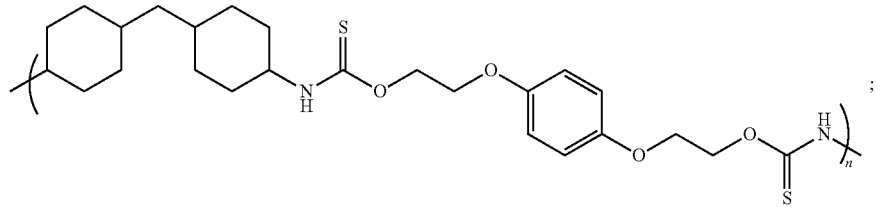
Formula I-7
wherein n is an integer in a range of 2 to 430.
* * * * *